US007573597B2

(12) United States Patent
Futami

(10) Patent No.: US 7,573,597 B2
(45) Date of Patent: Aug. 11, 2009

(54) COLOR IMAGE FORMING APPARATUS

(75) Inventor: Hiroyuki Futami, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 686 days.

(21) Appl. No.: 11/220,700

(22) Filed: Sep. 8, 2005

(65) Prior Publication Data

US 2006/0268340 A1 Nov. 30, 2006

(30) Foreign Application Priority Data

May 26, 2005 (JP) ............................. 2005-154210

(51) Int. Cl.
*G06K 15/00* (2006.01)
*G06F 3/12* (2006.01)
*H04N 1/60* (2006.01)

(52) U.S. Cl. .................... 358/1.16; 358/1.14; 358/1.13; 358/1.9; 358/1.15

(58) Field of Classification Search ............... 358/1.16, 358/1.15, 474, 1.14, 515, 523, 524, 444, 358/296, 301, 1.13, 1.9; 345/543, 546, 555
See application file for complete search history.

(56) References Cited

U.S. PATENT DOCUMENTS

| 4,577,272 | A | | 3/1986 | Ballew et al. | |
|---|---|---|---|---|---|
| 5,138,443 | A | * | 8/1992 | Ikeda et al. | 358/518 |
| 5,771,338 | A | * | 6/1998 | Nhu | 358/1.9 |
| 5,808,747 | A | * | 9/1998 | Telle | 358/296 |
| 5,978,561 | A | | 11/1999 | Kimura et al. | 358/1.16 |
| 6,177,934 | B1 | * | 1/2001 | Sugiura et al. | 715/748 |
| 6,272,248 | B1 | * | 8/2001 | Saitoh et al. | 382/218 |
| 6,338,145 | B1 | | 1/2002 | Yudenfriend et al. | |
| 6,462,842 | B1 | * | 10/2002 | Hamilton | 358/486 |
| 6,687,787 | B1 | * | 2/2004 | Richardson et al. | 711/114 |

(Continued)

FOREIGN PATENT DOCUMENTS

JP 03-045075 2/1991

(Continued)

OTHER PUBLICATIONS

R. Tewari et al., "High Avaliability in Clustered Muldimedia Servers", Data Engineering, 1996. Proceedings of the Twelfth International Conference in New Orleans, LA, IEEE Comput. Soc., pp. 645-654, XP010158966.

(Continued)

*Primary Examiner*—Twyler L Haskins
*Assistant Examiner*—Jonathan R Beckley
(74) *Attorney, Agent, or Firm*—Finnegan, Henderson, Farabow, Garrett & Dunner, L.L.P.

(57) ABSTRACT

In the event of a failure of one of the image storing devices provided to process colors separately, the image data allocated for the failed image storing device is sent to the image storing devices being allocated other colors and is stored therein. In the event of a partial failure of the a magnetic disk apparatus, the number of scanning lines per unit time during the document reading operation by the image reading section is reduced from the normal level or the page spacing during the reading operation by the image reading section is increased over the normal level. This arrangement ensures apparatus functions and provides a color image forming apparatus capable of continuous operations.

18 Claims, 15 Drawing Sheets

U.S. PATENT DOCUMENTS

| | | | |
|---|---|---|---|
| 6,804,033 B1 * | 10/2004 | Hara | 358/522 |
| 7,034,961 B2 * | 4/2006 | Moriura et al. | 358/1.9 |
| 7,104,626 B2 * | 9/2006 | Oyen | 347/19 |
| 7,336,395 B2 * | 2/2008 | Tone | 358/1.9 |
| 7,411,694 B2 * | 8/2008 | Nomizu | 358/1.16 |
| 2002/0140995 A1 | 10/2002 | Cardot et al. | |
| 2003/0081265 A1 * | 5/2003 | Watanabe | 358/474 |
| 2003/0095272 A1 * | 5/2003 | Nomizu | 358/1.9 |
| 2003/0137695 A1 * | 7/2003 | Nomizu | 358/1.16 |
| 2004/0114172 A1 * | 6/2004 | Ohyama et al. | 358/1.13 |
| 2004/0158675 A1 * | 8/2004 | Hirose | 711/115 |
| 2005/0024666 A1 * | 2/2005 | Ohyama et al. | 358/1.13 |
| 2006/0139388 A1 * | 6/2006 | Silverbrook et al. | 347/13 |

FOREIGN PATENT DOCUMENTS

| | | |
|---|---|---|
| JP | 06-098120 | 4/1994 |
| JP | 10 032690 A | 2/1998 |
| JP | 2000 215008 | 8/2000 |
| JP | 2004-201229 | 7/2004 |

OTHER PUBLICATIONS

Japanese Office Action dated Feb. 14, 2008 and English Translation.
Japanese Office Action and English Translation.

* cited by examiner

| | JOB NUMBER | xxxxz | | | | | | | | | |
|---|---|---|---|---|---|---|---|---|---|---|---|
| JOB DATA | NUMBER OF PAGES | 2 | | | | | | | | | |
| | NUMBER OF COPIES TO BE SET | 1 | | | | | | | | | |
| | | | STORAGE MODE INFORMATION | | | | | | | | |
| | PAGE NUMBER | COLOR NAME | 1ST BLOCK | | | 2ND BLOCK | | | 3RD BLOCK | | |
| | | | HDD NUMBER | LEADING ADDRESS | SIZE | HDD NUMBER | LEADING ADDRESS | SIZE | HDD NUMBER | LEADING ADDRESS | SIZE |
| PAGE DATA | PAGE 1 | Y | 1(M) | ab1 | vb1 | 2(C) | ab2 | vb2 | 3(K) | ab3 | vb3 |
| | | M | 1(M) | a2 | v2 | | | | | | |
| | | C | 2(C) | a3 | v3 | | | | | | |
| | | K | 3(K) | a4 | v4 | | | | | | |
| | PAGE 2 | Y | 1(M) | bb1 | wb1 | 2(C) | bb2 | wb2 | 3(K) | bb3 | wb3 |
| | | M | 1(M) | b2 | w2 | | | | | | |
| | | C | 2(C) | b3 | w3 | | | | | | |
| | | K | 3(K) | b4 | w4 | | | | | | |

210, 200, 230, 231, 232, 220

COLOR IMAGE FORMING APPARATUS

BACKGROUND OF THE INVENTION

The present invention relates to a color image forming apparatus or system wherein, after a colored document has been read by a reading section, the image data constituting a color image is stored into image storing devices separately for each color, particularly to the art of performing the functions of a color image forming apparatus or system even if some of the image storing device have been damaged.

A color image forming apparatus such as a copying machine is normally designed to achieve full-color image formation using the four colors of yellow (Y), magenta (M), cyan (C) and black (K). These four colors are managed as the image data for each color in the apparatus. A large capacity storage apparatus such as a magnetic disk device is commonly used as the image storing device for temporarily storing the image data in the apparatus. Four image storing devices for the respective colors are provided to implement high-speed input and output operations. They are operated in parallel for simultaneous four-color processing. This structure increases the processing speed virtually 400 percent, as compared to the case where image data for each color is stored sequentially into one image storing device.

Such a color image forming apparatus is equipped with multiple image storing devices. Accordingly, problems can occur that much sooner and, if any one of the devices has broken, the apparatus cannot function as a color image forming apparatus.

Various techniques have been proposed in an effort to ensure that the apparatus as a whole will operate correctly even if there are problems in some of the image storing devices. One of these proposals relates to an apparatus equipped with magnetic disk devices. Such a device having a drive mechanism as a magnetic disk device is more likely to have problems. An image forming apparatus is proposed in the Official Gazette of Japanese Patent Tokkai 2000-215008, wherein this image forming apparatus is provided with a recovery means for changing the storage site of the program data or the storage site of the image data so that the apparatus can be operated by the other normal magnetic disk devices if any one of them has broken down.

Another proposal is published in the Official Gazette of Japanese Patent Tokkaihei 10-32690, wherein, if one of the image storing devices for storing the image data for each color is fully loaded, the image data of the color allocated for the fully loaded image storing device is loaded into another image storing device so that the operations of the apparatus can be performed.

If the image data of the color allocated for the image storing device with a problem is stored in another normally operative image storing device that is free from any problem, the image storing device with the added load will take a longer time to store the image data than otherwise. However, the document reading time and image formation processing speed in the color image forming apparatus are set based on the storage time and reading time when all the image storing devices are normally operating. Accordingly, the image storing device with an added load cannot meet the time requirements for storage and reading of the image data. If there are not many pages, the shortage of processing time can be covered by a buffer memory. However, when many pages must be processed continuously, the shortage of processing time cannot be covered by the buffer memory alone. As a result, the document reading operation or image formation operation is suspended. This has created a problem in prior art.

SUMMARY OF THE INVENTION

To solve the aforementioned problem, the present invention provides a color image forming apparatus wherein the image data for an image storing device that has developed a problem is stored in other normally operative image storing devices that is free from any problem, thereby ensuring that the operations of the apparatus can be performed correctly, and continuous operation of image reading and image formation can be performed even under these conditions.

The aforementioned can be achieved by any one of the following structures:

(1) A color image forming apparatus for reading a document by optical scanning and for forming a color image by an image forming section, said color image forming apparatus comprising:

an image reading section for obtaining color-based image data for forming a color image;

a plurality of image storing devices for storing the color-based image data obtained by said image scanner, deviding for each color;

a scanning speed control section for controlling the number of the scanning lines per unit time for said image reading section; and a storage control section for controlling the storage of the image data into said image storing devices, and for reading the image data stored in said image storing devices;

wherein, if the function of any one of said image storing devices has failed, the storage control section stores the image data of the color for the image storing device failed in the function, into normally operative image storing device; and the scanning speed control section reduces the number of the scanning lines per unit time for said image reading section, from the normal level.

(2) A color image forming apparatus for reading a document by optical scanning and for forming a color image by an image forming section, said color image forming apparatus comprising:

an image reading section for obtaining color-based image data for constituting a color image;

a plururity of image storing devices for storing the image data obtained by said image scanner, dividing for each color;

a page spacing control section for controlling the page spacing for which the image reading section scans a document; and a storage control section for controlling the storage of the image data into said image storing devices, and for reading the image data stored in said image storing devices;

wherein, if the function of any one of said image storing devices has failed, the storage control section stores the image data of the color allocated for the image storing device failed in the function, into normally operative image storing device; and the page spacing control section increases the page spacing in the image reading section over the normal page spacing.

DETAILED DESCRIPTION OF THE PREFERRED EMBODIMENT

Figure 1:
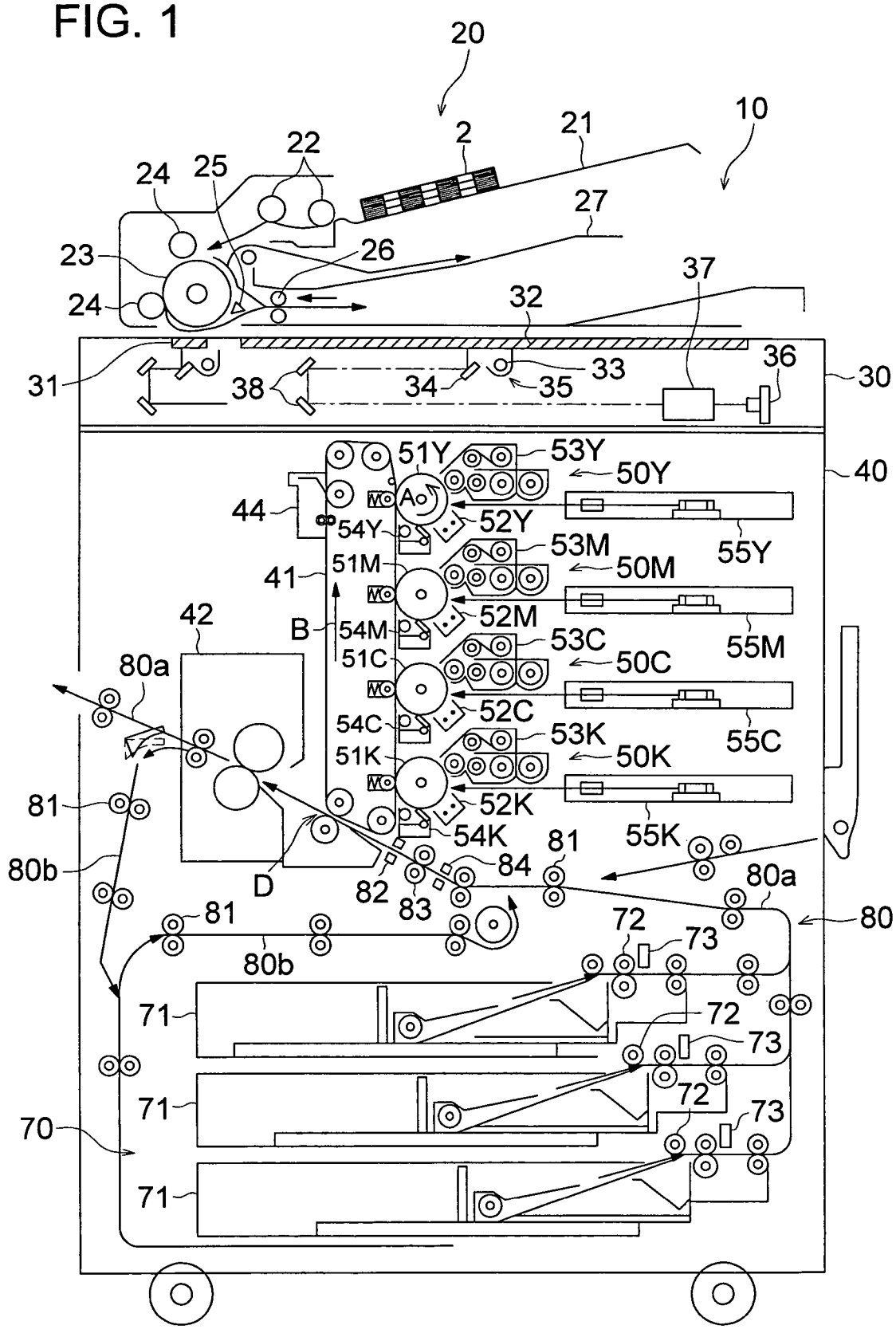
FIG. 1 is a cross sectional view representing the schematic configuration of a color image forming apparatus as an embodiment of the present invention.

The following describes the embodiment of the present invention with reference to drawings:

FIG. 1 is a cross sectional view representing the schematic configuration of a color image forming apparatus 10 as an embodiment of the present invention. The color image forming apparatus 10 is also called a color digital copying machine. It has a function of reading the document image in colors, forming the copied color image on transfer paper, and outputting the result thereof.

The color image forming apparatus 10 has an automatic document feeder 20, a reading section 30 and a printer 40. The automatic document feeder 20 feeds the documents 2 stacked on a document tray 21, one by one to the scanning position of the reading section 30, and ejects the document having been read, to the ejection tray 27. For double-sided documents, after one side has been read, the automatic document feeder 20 reverses the documents and feeds them to the reading section 30.

The automatic document feeder 20 comprises a sheet feed roller 22 for sequentially feeding the documents mounted on the document tray 21, starting from the uppermost portion of the documents; a contact roller 23 for allowing the documents to pass, while keeping them in contact with the contact glass 31 where the document is read; and a guide roller 24 for guiding the document 2 fed by the sheet feed roller 22, along the contact roller 23. The automatic document feeder 20 also comprises a switching claw for switching the direction of the document having been passed through the contact glass 31; a reversing roller 26 for changing the front/back sides of double-sided documents; and an ejection tray 27 where the documents having been read are ejected.

The reading section 30 serves as an image reading means, and scans the documents in colors. Specifically, it separates documents into the three colors of red (R), green (G) and blue (B), reads them optically, and outputs the image data for each color obtained by converting these colors into density data for the four colors of yellow (Y), magenta (M), cyan (C) and black (K).

The reading section 30 comprises an exposure scanning section 35 composed of a light source 30 and a mirror 34; a color line image sensor 36 for receiving light reflected from the document and outputting an electrical signal for each color in response to light intensity; a condensing lens 37 for condensing the light reflected from the document, to an line image sensor 36; and various types of mirrors 38 for leading light reflected from the mirror 34 of the exposure scanning section 35, to the color line image sensor 36.

To read the document fed by the automatic document feeder 20, the exposure scanning section 35 moves to the reading position below the contact glass 31 and stops there to read the documents fed by the contact roller 23 over that position. To read the documents placed on a platen glass 32, the exposure scanning section 35 moves from left to right along the bottom surface of the platen glass 32 to read the documents at a standstill.

The printer 40 serves as an image forming means. It is a tandem color printer based on electrophotographic technology. The printer 40 comprises an endless belt intermediate transfer belt 41; the image forming units 50Y, 50M, 50C and 50K for forming an image of a single color on the intermediate transfer belt 41; a sheet feeding section 70 for feeding transfer paper; a sheet conveyance section 80 for conveying the transfer paper having been fed; and a fixing apparatus 42.

The image forming unit 50Y forms a yellow (Y) image on the intermediate transfer belt 41, and the image forming unit 50M forms a magenta (M) image on the intermediate transfer belt 41.

The image forming unit 50C forms a cyan (C) image on the intermediate transfer belt 41, and the mage forming unit 50K forms a black (K) image on the intermediate transfer belt 41.

The image forming unit 50Y comprises a cylindrical photoconductor drum 51 with an electrostatic latent image formed thereon, a charging apparatus 52Y arranged on the periphery thereof, a development apparatus 53Y and a cleaning apparatus 54Y. It is also provided with a laser unit 55Y composed of a laser diode, a polygon mirror, various lens and mirrors.

Driven by a drive unit (not illustrated), the cylindrical photoconductor drum 51Y is rotated in a fixed direction (A-marked direction in the drawing), and the charging apparatus 52Y electrically charges the cylindrical photoconductor drum 51Y uniformly. The laser unit 55Y applies the laser beam to the photoconductor drum 51Y wherein this laser beam is turned on and off in response to the Y-colored image data. This procedure allows the electrostatic latent image to be formed on the photoconductor drum 51Y. The development apparatus 53Y develops this electrostatic latent image using yellow (Y) toner, and this toner image is transferred onto the intermediate transfer belt 41 at the position in contact with the intermediate transfer belt 41. After transfer, the cleaning apparatus 54Y uses a blade or the like to scrape and remove the toner remaining on the surface of the photoconductor drum 51Y so as to collect the toner.

The image forming unit 50M, image forming unit 50C and image forming unit 50K are the same as the image forming unit 50Y, except that the toner colors are different and a laser beam is turned on and off by the image data corresponding to each color; therefore, individual descriptions will be omitted. The same component parts are assigned with the same reference numerals followed by M, C or K instead of Y.

The intermediate transfer belt 41 is wound onto rollers, and is supported by them in such a way that it can rotate. The intermediate transfer belt 41 is driven in the B-marked direction by a drive means (not illustrated). While the belt is driven, color images are superimposed on one another on the intermediate transfer belt 41 in the order of (Y), (M), (C) and (K) by the image forming units 50Y, 50M, 50C and 50K, whereby a color image is formed. This color image is transferred from the intermediate transfer belt 41 to the transfer paper at the second transfer position D provided on the bottom end along the path of the intermediate transfer belt 41. After transfer, the toner remaining on the surface of the intermediate transfer belt 41 is removed by a cleaning apparatus 44.

The sheet feeding section 70 has several sheet feeding cassettes 71, which normally incorporate sheets of transfer paper having different sizes and types. A first sheet feeding roller 72 is mounted in the vicinity of the outlet of the sheet feeding cassette 71, wherein the first sheet feeding roller 72 feeds out the uppermost sheets of the transfer paper stacked in the sheet feeding cassette 71, one by one toward the sheet conveyance section 80. Further, the outlet of the sheet feeding cassette 71 is provided with a sheet feed sensor 73 for detecting the transfer paper that has been fed out.

The sheet conveyance section 80 comprises a normal path 80a and a reversing path 80b. The normal path 80a ensures that the transfer paper having arrived from the sheet feeding cassette 71 passes through the second transfer position D and fixing apparatus 42, and is ejected to an ejection tray out of the apparatus. The reversing path 80b ensures that, after the side of the transfer paper having passed through the fixing apparatus 42 has been reversed, the transfer paper is again fed along the normal path 80a upstream from the second transfer position D. The paths 80a and 80b contain multiple conveyance rollers 81 arranged at intervals smaller than the size of the transfer paper having the minimum size in the feed direction.

A leading edge sensor 82 for detecting the leading edge of the transfer paper is provided just short of the transfer position D in the sheet conveyance section 80. Further, a second sheet feed roller 83 is located just short of it. Still further, a second sheet sensor 84 for detecting the arrival of the transfer paper is located just short of the second sheet feed roller 83.

If the image data of the next page is not ready, the transfer paper having been fed from the sheet feeding cassette 71 stops once before the second sheet feed roller 83. When the image data is ready, the paper is fed again. According to the timing when the leading edge sensor 82 has detected the leading edge, an electrostatic latent image is formed by the laser units 55Y, 55M, 55C and 55K.

The timing of the end of the image transfer to the transfer paper is recognized based on the time elapsed after the leading edge of the transfer paper is detected by the leading edge sensor 82. Specifically, the length of time from detection by the leading edge sensor 82 to the termination of transfer is registered in advance for each size of transfer paper. Termination of the transfer operation is recognized when the time corresponding to the size of the transfer paper has passed following detection of the leading edge of transfer paper by the leading edge sensor 82.

Figure 2:
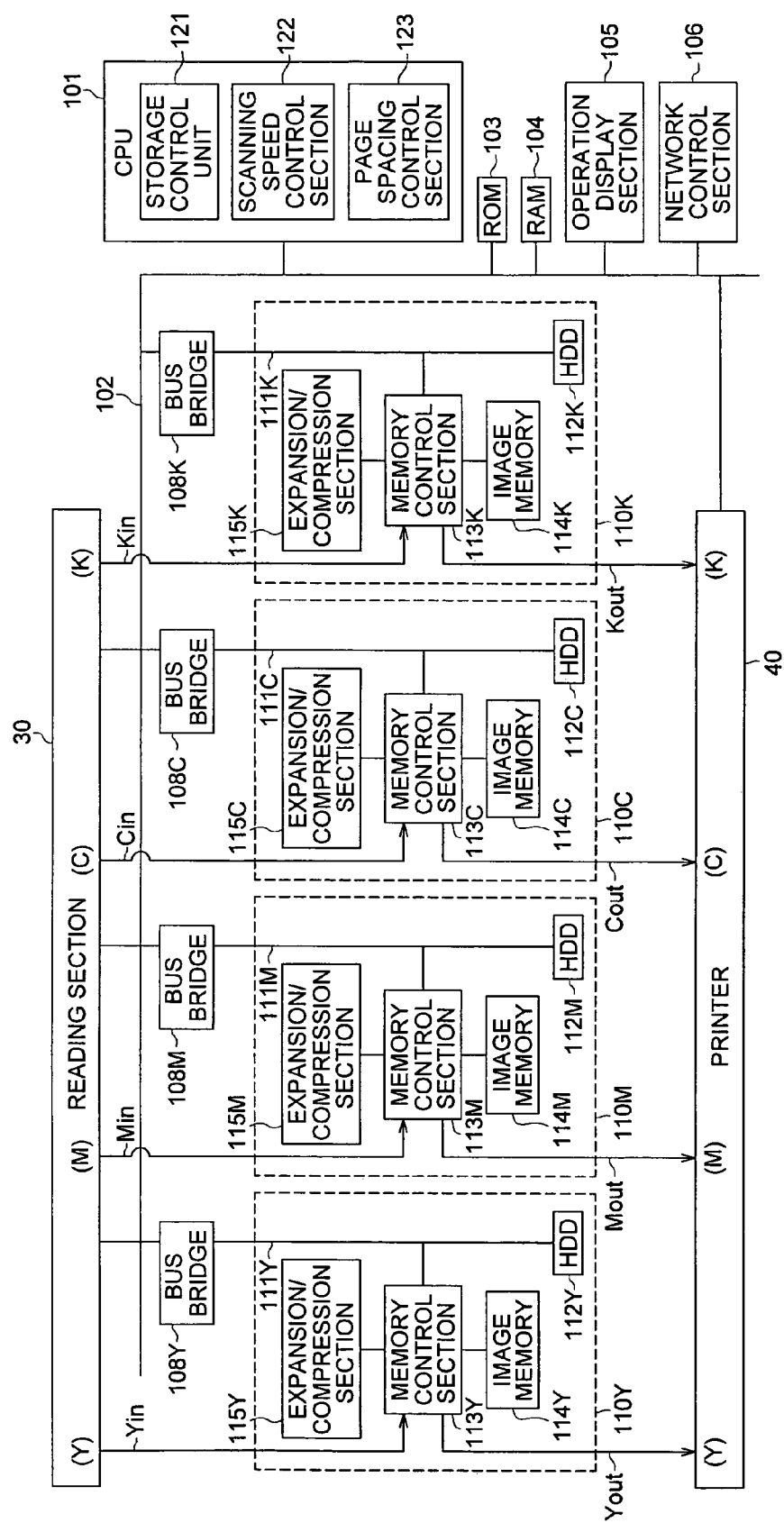
FIG. 2 is a block diagram representing the electrical configuration of a color image forming apparatus as an embodiment of the present invention.

FIG. 2 represents the electrical configuration of a color image forming apparatus 10. The color image forming apparatus 10 contains a CPU (Central Processor Unit) 101 for administrative control of the operation of various apparatuses and devices. The CPU 101 is connected with a reading section 30 and a printer 40 through a system bus 102. In addition, the CPU 101 is also connected with a ROM (Read Only Memory) 103, a RAM (Random Access Memory) 104, an operation display section 105, a network control section 106, and image blocks Y110, 110M, 110C and 110K for the colors Y, M, C and K colors, respectively, through bus bridges 108Y, 108M, 108C and 108K.

The ROM 103 stores various programs and fixed data to be executed by the CPU 101. The RAM 104 is used as a work memory of the CPU 101. In addition, the RAM 104 is also used as temporary storage when the image data is forwarded. The operation display section 105 serves the user by providing various forms of guide indications and status displays. It also receives various operations from the user. The operation display section 105 contains a liquid crystal display equipped with a touch panel, various types of operation switches, and a CPU for operation section control.

The network control section 106 is a circuit for exchanging varieties of data via a network such as the LAN (Local Area Network) with an external computer. The network control section 106 provides a means for image input.

The image blocks 110Y, 110M, 110C and 110K are the circuit blocks for handling the image data for each color. The image block 110Y processes the Y-color image data, the image block 110M the M-color image data, the image block 110C the C-color image data, and the image block 110K the K-color image data. The image data is treated separately for each of the color-based image blocks 110Y, 110M, 110C and 110K throughout the entire process from inputting to outputting. This procedure provides perfectly simultaneous parallel processing, thereby improving the processing capabilities of the color image forming apparatus 10.

The image block 110Y has an image bus 111Y connected downstream from the bus bridge 108Y. This is connected with a magnetic disk device 112Y for storing the image data, and a memory control section 113Y. An image memory 114Y and an expansion/compression section 115Y are connected under the control of the memory control section 113Y.

The Y-color image data Yin that was input from the reading section 30 is inputted into the memory control section 113Y. The memory control section 113Y writes this image data into the image memory 114Y after this image data has been compressed by the expansion/compression section 115Y. It also ensures that the compressed Y-color image data stored in the image memory 114Y is expanded by the expansion/compression section 115Y and is stored again into the image memory 114Y, and the expanded Y-color image data is read sequentially and is outputted to the Y-color laser unit 55Y of the printer 40.

Further, the memory control section 113Y allows the image data on the image bus 111Y to be written into the image memory 114Y in response to the request for access from the image bus 111Y. It also ensures that the image data read out of the image memory 114Y is outputted to the image bus 111Y.

The structure and operation of the image blocks 110M, 110C and 110K are the same as those of the image block 110Y, except that the colors to be handled by them are different; therefore, their details will not be described to avoid duplication. The same component parts as those of the image block 110Y will be assigned with the same reference numerals followed by M, C or K instead of Y.

The magnetic disk devices 112Y, 112M, 112C and 112K classified by color provide the storage areas for storing the image data scanned by the reading section 30. They serve as image storing devices. The color image forming apparatus 10 is configured in such a way that, when any one of the magnetic disk devices 112Y, 112M, 112C and 112K has broken, the faulty one can be replaced by a new one.

The CPU 101 has the functions of a storage control unit 121, a scanning speed control section 122 and a page spacing control section 123.

The storage control unit 121 controls the storage of image data into the magnetic disk devices 112Y, 112M, 112C and 112K and the reading of image data. Further, when any one of the magnetic disk devices 112Y, 112M, 112C and 112K has been broken or fully loaded, and the function has failed, the storage control unit 121 stores the image data of the color for the failed magnetic disk device to another magnetic disk device. Further, it memorizes the storage status information representing the storage status at the time of storage, and reads out the image data of each color from the corresponding magnetic disk device according to the storage status information at the time of scanning.

The scanning speed control section 122 controls the linear speed, which is the value indicated by the reading section 30 to show the number of scanning lines per unit time (e.g., 1 sec.). The scanning speed control section 122 reduces the linear speed with the resolution kept unchanged, by reducing the conveyance speed of the document in the sub-scanning direction and by increasing the per-line scanning period. If the linear speed is reduced below the normal speed, the read time per document page is made longer than usual. In this case, the number of the reading clocks per line applied to the line image sensor 36 is increased by addition of a dummy clock, whereby the per-line scanning period is increased. This procedure adjusts the processing cycle in a simple manner, as compared to the case of using the method of changing the clock frequency.

The page spacing control section 123 controls the time interval between the completion of feeding out the previous page by the automatic document feeder 20 and the start of feeding the next page. It also controls the intervals of conveying the transfer paper in the sheet conveyance section 80. For example, it is possible to use the method of increasing the time interval between the feeding of the transfer paper by the first sheet feeding roller 72 and feeding out to the sheet conveyance section 80, over the normal time interval. It is also possible to increase the page interval more than normal by adjusting the timing when the second sheet feed roller 83 feeds out the transfer paper to the transfer position D.

Figure 3:
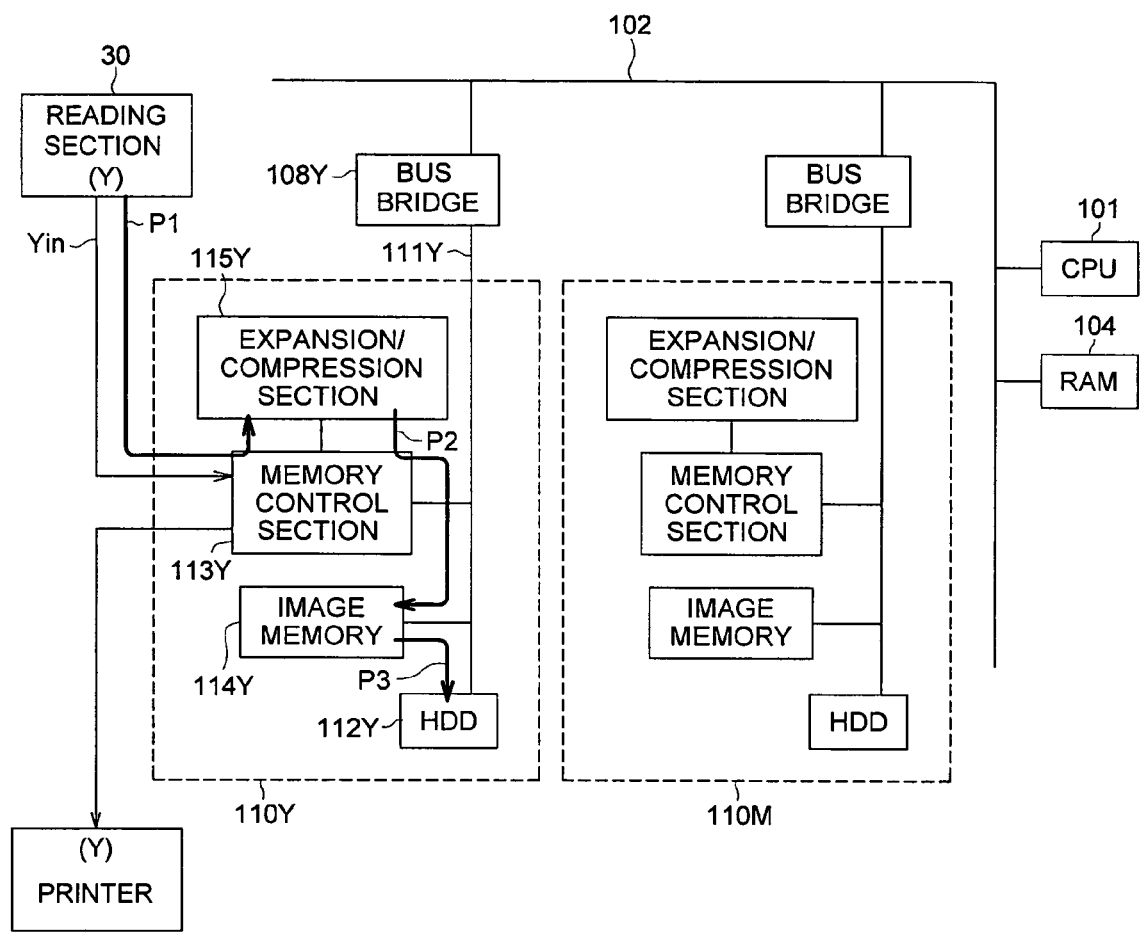
FIG. 3 is an explanatory diagram showing the flow of the image data in the image input operation under normal conditions.
Figure 4:
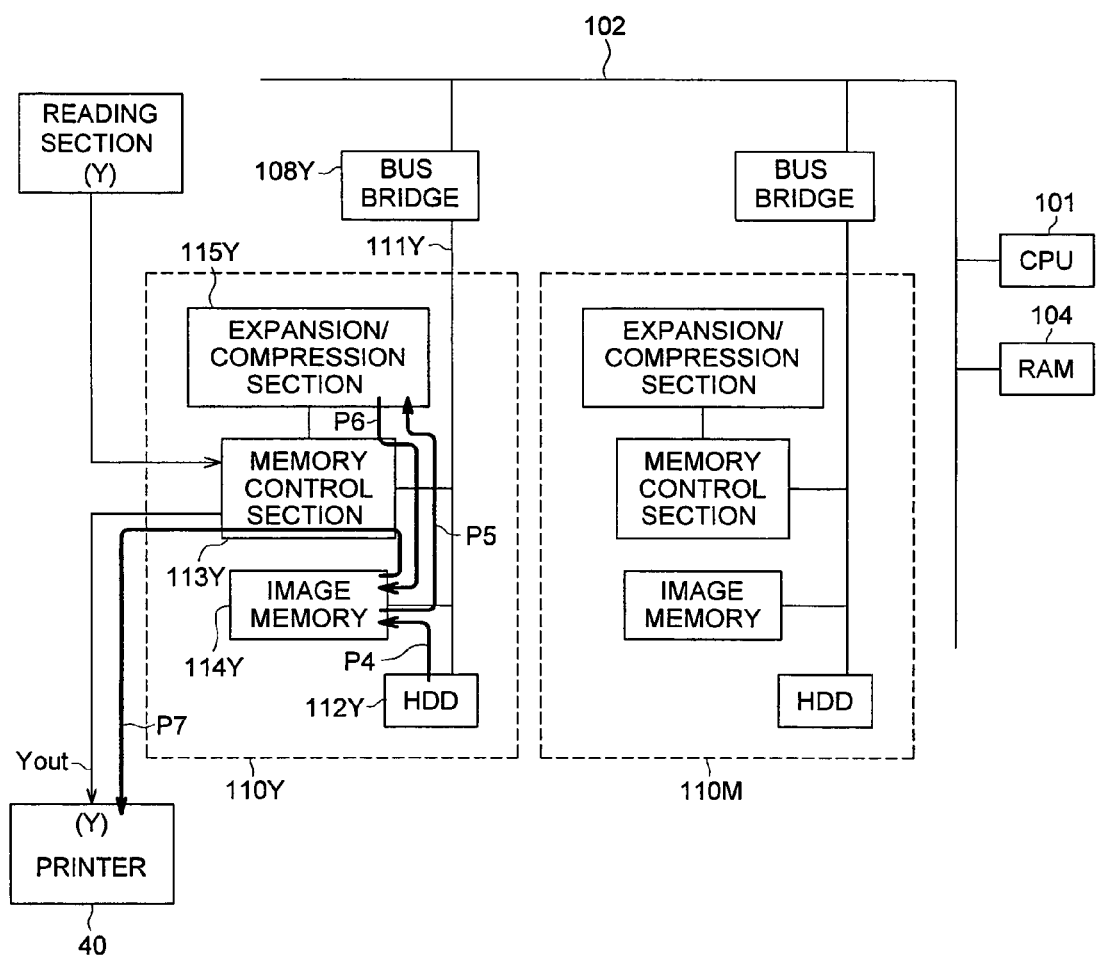
FIG. 4 is an explanatory diagram showing the flow of the image data in the image output operation under normal conditions.

Referring to FIGS. 3 and 4, the following describes the flow of image data in normal operation using the example of the operation of copying a document. The copying operation is performed by a combination of the step of scanning the document and storing the color-based image data into the magnetic disk devices 112Y, 112M, 112C and 112K; and the step of scanning the image data from the magnetic disk devices 112Y, 112M, 112C and 112K and outputting the image data to the printer 40 so that the image data is printed. FIG. 3 shows the flow of the image data in the image input operation, and FIG. 4 represents the flow of the image data in the image output operation.

In the image input operation and image output operation, the flow of color-based-image data is the same in each of the image blocks 110Y, 110M, 110C and 110K. FIGS. 3 and 4 show the case of Y-color image data alone as representative data, without referring to the cases of the image data of other colors.

As shown in FIG. 3, in the image input operation, the Y-color image data Yin is outputted from the reading section 30 according to the document scanning operation, and is inputted into the image block 110Y allocated for the Y color. The inputted image data is sequentially compressed by the expansion/compression section 115Y (Path P1). The compressed image data is once stored in the image memory 114Y (Path P2). Then the data forwarding means (not illustrated) serves as a bus master so that the image data is forwarded to the magnetic disk device 112Y and is stored therein (Path P3).

Similarly to the case of the Y-color, the image data Min of M-color is stored in the magnetic disk device 112M, the image data Cin of C-color in the magnetic disk device 112C and the image data Kin of K-color in the magnetic disk device 112K. The image data of these colors is outputted simultaneously in parallel from the reading section 30 and is processed simultaneously in parallel to be stored in the storage site for each color.

As shown in FIG. 4, in the image output operation, the color-based image data constituting a color image is read from the magnetic disk device 112Y and is once stored in the image memory 114Y (Path P4). The image data is then expanded by the expansion/compression section 115Y (Path P5), and is again loaded into the image memory 114Y (Path P6). Further, Y-color image data Yout is outputted from the image memory 114Y to the printer 40 according to a predetermined timing signal supplied from the printer 40 (Path P7).

Similarly to the case of the Y-color, in the M-color image block 110M, the M-color image data Mout is read from the magnetic disk device 112M, and is outputted to the printer 40. In the C-color image block 110C, the C-color image data Cout is read from the magnetic disk device 112C and is outputted to the printer 40. In the K-color image block 110K, the K-color image data Kout is read from the magnetic disk device 112K, and is outputted to the printer 40.

The color-based image data Yout, image data Mout, image data Cout and image data Kout are outputted simultaneously in parallel from the printer 40 according to a predetermined timing signal supplied from the printer 40. Based on the image data having been received, the printer 40 forms a color image on the transfer paper and outputs it.

Figure 5:
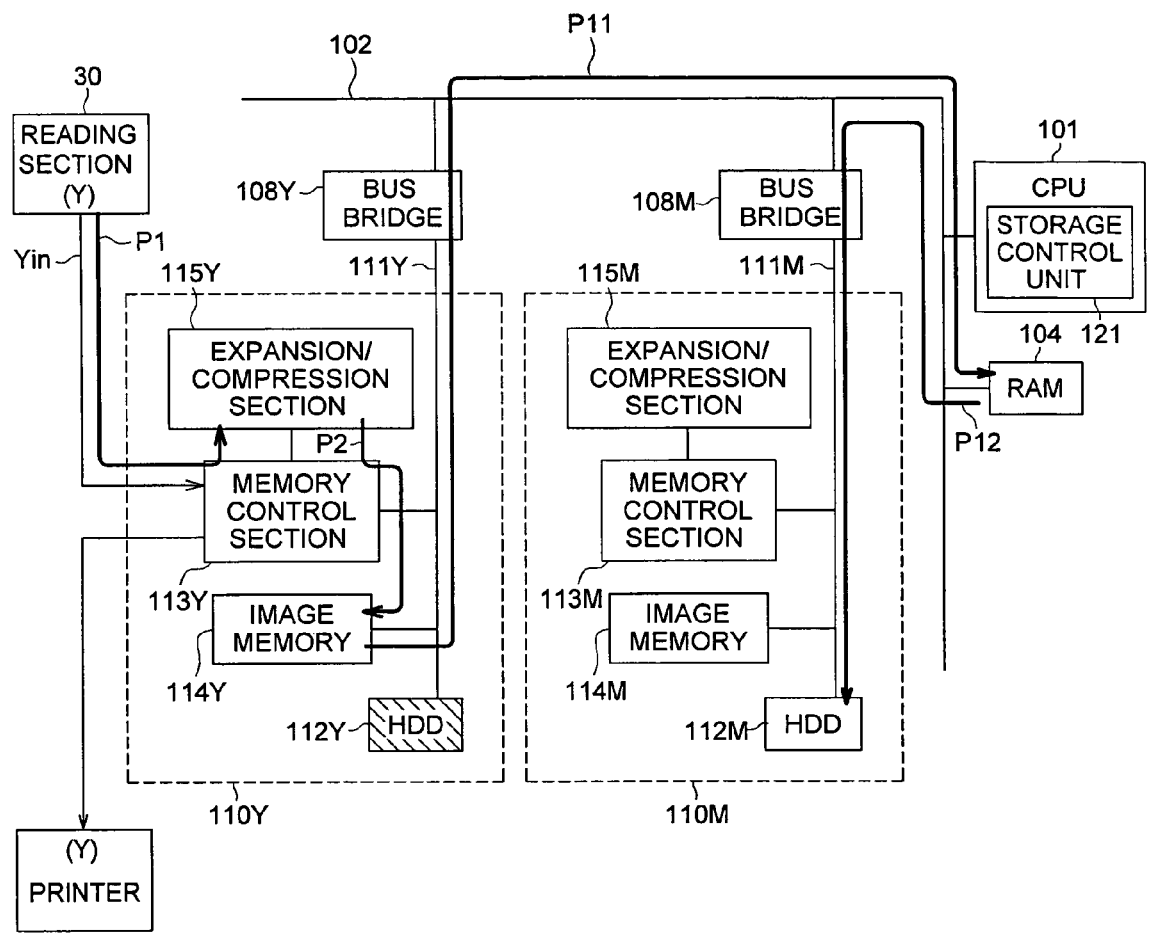
FIG. 5 is an explanatory diagram showing the flow of data when color data of a failed magnetic disk device is loaded into a normal magnetic disk device.

FIG. 5 shows the flow of data when the image data for a magnetic disk device failed in the function (hereinafter referred to as "failed color data") is stored into other magnetic disk devices. In FIG. 5, the magnetic disk device 112Y for Y-color has failed and the Y-color is loaded into the magnetic disk device 112M, by way of an example. The causes for failure of the device function include a device failure, a full load (insufficient available space) and the removal of the magnetic disk device. The following describes the example of a device failure.

The image data Yin inputted from the reading section 30 is temporarily stored in the image memory 114Y through the same paths (Paths P1 and P2) as those in the normal operation shown in FIG. 3. The storage control unit 121 transfers the Y-color image data stored in the image memory 114Y to the RAM 104, instead of the faulty magnetic disk device 112Y, through the Y-color image bus 111Y, bus bridge 108Y and system bus 102. Then the image data is stored in the RAM 104 (Path P11).

The storage control unit 121 stores the Y-color image data of the RAM 104 into the magnetic disk device 112M from the system bus 102 through the bus bridge 108M and M-color image bus 111M (Path P12).

The image data of the color inherently allocated for the magnetic disk devices 112M, 112C and 112K is stored into the magnetic disk devices 112M, 112C and 112K through the path shown in FIG. 3. It is also possible to arrange that the failed color data is stored in other magnetic disk devices operating normally. In this case, the image data temporarily stored in the RAM 104 is divided into several pieces, and is stored to the magnetic disk device of each storage site from this position through the same path as the P12.

Figures 6, 7:
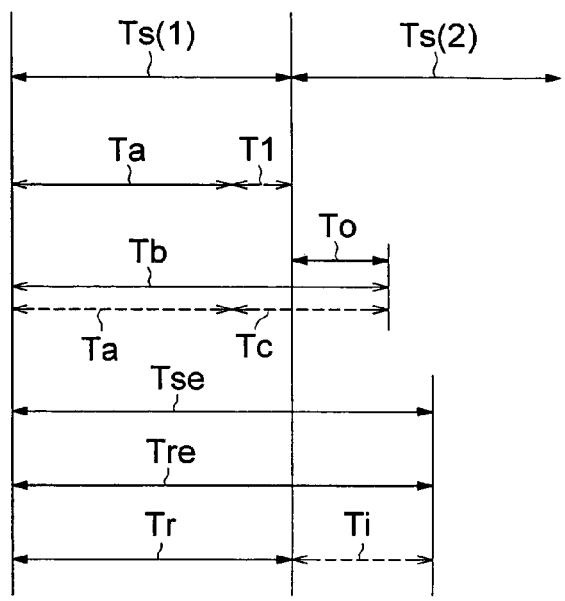
FIG. 6 is an explanatory diagram showing the relationship between the document scanning time and processing time for loading the scanned image data into the magnetic disk device.
FIG. 7 is an explanatory diagram showing an example of the job management table where the stored status information is registered.

FIG. 6 shows the relationship between the document scanning time and the processing time for loading the scanned image data into the magnetic disk device. The term "normal" appearing the following description means that all the magnetic disk devices are operating properly in satisfactory condition.

The normal scanning cycle Ts indicates the scanning cycle for the reading section 30 to scan the documents on a continuous basis in normal times when all the magnetic disk devices 112Y, 112M, 112C and 112K are operating properly in satisfactory condition. The period Ts(1) indicates the first page scanning time period, and the period Ts(2) the second page scanning time period.

The normal storage time Ta indicates the time required to store image data for one page into the magnetic disk devices 112Y, 112M, 112C and 112K in normal times when all the magnetic disk devices 112Y, 112M, 112C and 112K are operating properly in satisfactory condition. Specifically, it indicates the storage time required to store the image data for one color each into the magnetic disk devices 112Y, 112M, 112C and 112K. The allowance time T1 refers to the difference between normal scanning cycle Ts and normal storage time Ta.

Storage time Tb at the time of failure indicates the time required to store the data in the magnetic disk device that will process the image data of the color previously allocated for the faulty magnetic disk device. The storage time Tb at the time of failure represents the total time between the normal storage time Ta required to store the image data of the color inherently allocated for that magnetic disk device, and the time required to store the failed color data (burden time Tc). The amount of storage data is increased by the amount corresponding to the failed color data. The storage time Tb at the time of failure is greater than the normal scanning cycle Ts by the insufficient time To.

Even if insufficient time To has occurred, the image data corresponding thereto is temporarily stored into the image memory 114. This procedure will solve the problem up to a certain page. If a great number of pages are to be scanned on a continuous basis, the image memory 114 cannot cover the accumulated insufficient time To, with the result that the image scanning operation cannot be continued. To solve this problem, the present embodiment provides control in such a way that, if any magnetic disk device has failed, the page-based scanning cycle for the reading section 30 to read the documents on a continuous basis is changed to the scanning cycle. Tse at the time of failure that is longer than the normal scanning cycle Ts.

The scanning cycle can be made longer than that at normal times by reducing the linear speed or increasing the spacing between pages. When the linear speed is reduced, the document is scanned at a lower speed than normally thereby prolonging the scanning cycle. Specifically, the scanning operation is performed using the time almost equal to the scanning cycle Tse at the time of failure (scanning time at reduced linear speed Tre). When the spacing between pages is expanded, the document reading operation is performed in the normal scanning time Tr corresponding to the normal scanning cycle Ts. After that, a waiting time of a time interval Ti is inserted before the next document scanning operation starts. Specifically, the scanning operation time with expanded page spacing, as the scanning cycle when the spacing between pages is expanded, is equal to normal scanning time Tr plus time interval Ti.

In either of these methods, the scanning cycle Tse at the time of failure is longer than the storage time Tb at the time of failure, so that insufficient time To does not occur. This allows a great number of documents to be read on a continuous basis. When more than one magnetic disk device has failed, the scanning cycle Tse at the time of failure should be set in response to the insufficient time occurring at that time.

The aforementioned description can be summarized as follows: the processing time in other image storing device is increased by the time equivalent to the amount of the burden of storing the image data of the color previously allocated for the image storing device failed in the function. To solve this problem, the number of scanning lines per unit time of scanning or forming the image is reduced from the normal level. This procedure increases the processing time per page, thereby maintaining a proper balance.

Specifically, when an image storing device has failed, the image data of the color it had been processing is stored into other image storing devices. This increases the image data storing time of other image storing devices over the normal time. The image data input/output processing speed in the image storing device cannot catch up with the scanning speed or image forming speed. Particularly when a great number of pages are processed on a continuous basis, the difference in processing time cannot be covered by the buffer memory alone.

To solve this problem, the number of scanning lines per unit time is reduced from the normal level, and the scanning or image formation time per page is prolonged, thereby ensuring the processing time required by the image storing device, and allowing the continuous operation of image scanning or formation. "The number of scanning lines per unit time is reduced from the normal level" in the above statement refers to reduction in the number of scanning lines from the number of scanning lines per unit time in normal conditions when all the image storing devices are operating correctly.

Further, the time duration from the termination of the processing of per-page scanning or image formation to the start of processing of the next page is prolonged over the normal level, thereby substantially prolonging the time spent by the image storing device to process one page and ensuring the processing time required for continuous operation of image scanning and formation. "Increase the page spacing in the image reading section over the normal page spacing" indicates that the page spacing is increased over the document reading space in normal times when all the image storing devices are operating correctly.

The image data for each color is based on the four colors of yellow (Y), magenta (M), cyan (C) and black (K) normally used to implement full-color printing. Other colors or a greater number of fundamental colors may be used for the image data. One image storing device may process one or more colors.

That the function of the image storing device has failed means failure of the image data to be stored. The causes for failure of the device function include failure of the image storing device, an insufficient available space of the magnetic disk device and removal of the magnetic disk device.

FIG. 7 shows an example of the job management table 200 used by the color image forming apparatus 10 to manage the execution of a job. The job management table 200 comprises job data 210 for managing the entire job and page data 220 for managing the per-page information contained in that job.

The job data 210 contains the registered attribute information for the entire job such as the job number and the number of the pages for the job. The page data 220 includes registered storage form information 230 that represents the image data storage form, for each color, of a particular page for each page. Specifically, the storage form information for each page comprises the storage form information for Y-color image data of that page, the storage form information for M-color image data of that page, the storage form information for C-color image data of that page, and the storage form information for K-color image data of that page.

In FIG. 7, the storage form information 230 of each page is registered in a line given in the "Color name" column in the form associated with the color name. The storage form information 230 comprises the first, second and third blocks. This arrangement corresponds to the case where the image data for the color allocated for the faulty magnetic disk device is assigned to other magnetic disk devices and is stored in them separately.

The image data separated into several pieces is handled as follows: The storage information of the image data previously located at the first position of the leading edge of the image data before being separated is registered in the first block. The storage information of the image data previously located at the second position of the leading edge of the image data before being separated is registered in the second block. The storage information of the image data previously located at the third position of the leading edge of the image data before being separated is registered in the third block.

When the image data for one color for the faulty magnetic disk device is not stored separately, only the first block is used. When it is separated in two pieces and is stored, only the first and second blocks are used. The image data of the color allocated for the correctly working magnetic disk device is stored without being separated, so the storage information thereof is registered only in the first block.

Each block of the storage form information 230 comprises: a "HDD number" as identification information for identifying the magnetic disk device where data is stored; a "leading address" for indicating the storage position of the image data in the magnetic disk device (i.e. leading sector represented in the logical block addressing method); and a "size" showing the size of the image data.

FIG. 7 illustrates an example of the job management table 200 in cases where the magnetic disk device 112Y allocated for the Y-color has broken and the Y-color image data for this device is stored separately into the correctly working three magnetic disk devices 112M, 112C and 112K.

In the case of the storage form information 231 on the Y-color image data of the first page, for example, pieces of the storage information are registered in the first, second and third blocks. The Y-color image data is separated into three pieces and is stored separately.

The storage information of the first block indicates that the leading piece of image data having been separated is stored in the M-color magnetic disk device 112M of HDD number "1", the leading edge of that storage address is "ab1", and the size of that data is "vb1". Similarly, the storage information of the second block indicates that the second piece of image data having been separated is stored in the C-color magnetic disk device 112C of HDD number "2", the leading edge of that storage address is "ab2", and the size of that data is "vb2". The storage information of the third block indicates that the third piece of image data having been separated is stored in the K-color magnetic disk device 112K of HDD number "3", the leading edge of that storage address is "ab3", and the size of that data is "vb3".

The storage form information 232 on the M-color image data of the first page indicates that the data is stored in the M-color magnetic disk device 112M of HDD number "1", the leading edge of that storage address is "a2", and the size of that data is "v2". Specifically, the image data of M-color data is normally stored in the magnetic disk device 112M for the M color, without being separated.

The data stored in a separated form, such as the Y-color image data of the first page, is scanned according to the storage information registered in the first, second and third blocks of the storage form information 231, and image data is merged in the order of blocks, whereby separated data can be reconfigured to the state prior to separation.

Figure 8:
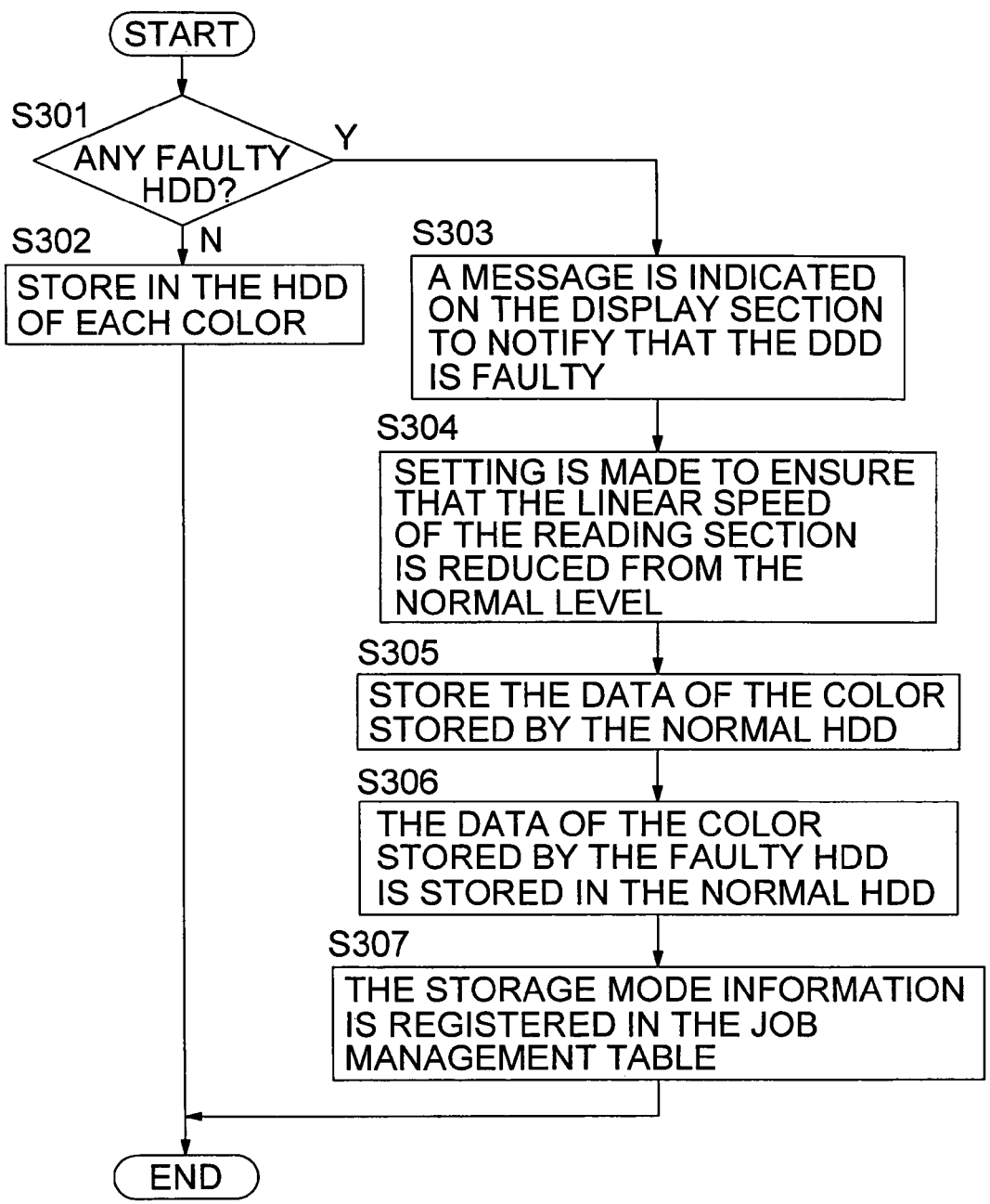
FIG. 8 is a flowchart showing the process of storing the image data when the linear speed at the time of document reading is reduced.

FIG. 8 shows the process of storing the image data of various colors scanned by the reading section.

Before the document scanning operation starts, the storage control unit 121 checks if the magnetic disk devices 112Y, 112M, 112C and 112K for storing the image data are faulty or not (Step S301). If they are not faulty (N in Step S301), the image data of each color is stored in the magnetic disk devices 112Y, 112M, 112C and 112K respectively, along the path shown in FIG. 3 (Step S302), and the processing terminates (END).

If any of the magnetic disk devices is faulty (Y in Step S301), the operation display section 105 indicates a message to notify that the magnetic disk device is faulty (Step S303). Setting is made so that the linear speed in the reading section 30 is lower than the normal speed, and the document is read (Step S304).

The scanned image data of the colors for the respective magnetic disk devices is stored in the normally working magnetic disk devices along the path illustrated in FIG. 3 (Step S305). Further, the image data (failed color data) for the faulty magnetic disk device is stored in the normally working magnetic disk devices along the path shown in FIG. 5 (Step S306). In this case, the storage form information 230 indicating the storage form of the image data of each color is registered in the job management table 200 (Step S307), and the processing terminates (END).

The job management table 200 should be stored in the nonvolatile memory and magnetic disk device. When it is to be outputted immediately as in the computer, it can be stored in a volatile memory. The failed color data is stored in the normally working magnetic disk devices according to various storage forms, which will be discussed in greater detail.

When data is scanned at a reduced linear speed, per-page scanning time is longer than usual. This arrangement allows continuous scanning of the document, despite the presence of a faulty magnetic disk device, and the scanned data can be stored in the normally working magnetic disk devices.

This arrangement ensures smooth flow of the document as in normal scanning operation, without the user feeling a sense of incompatibility. Further, the operation display section 105 shows a message that a failure has occurred in the magnetic disk device. Thus, the user working with the color image forming apparatus 10 realizes that the magnetic disk device is faulty. The user can operate the color image forming apparatus 10 based on a correct understanding of the reason for the speed reduction. Further, the message allows the user to make a request for repair of the magnetic disk device.

Figure 9:
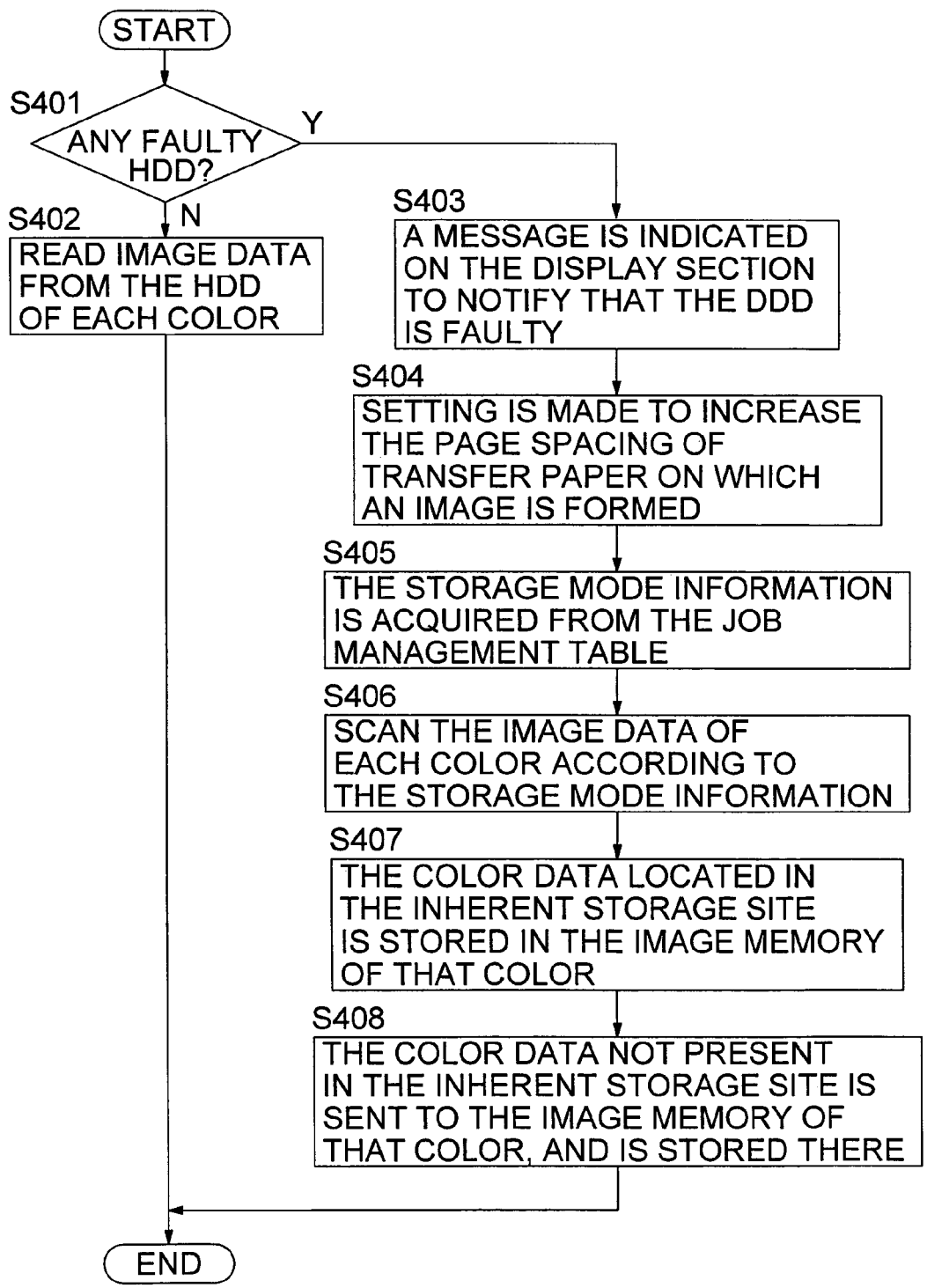
FIG. 9 is a flowchart showing the process of reading the image data stored in the magnetic disk device and outputting it to a printer.

FIG. 9 shows the process of reading the image data stored in the magnetic disk device and outputting it to a printer 40.

The storage control unit 121 checks if the magnetic disk devices 112Y, 112M, 112C and 112K are faulty or not (Step S401). If no device is faulty ((N in Step S401), the storage control unit 121 reads the image data of the colors from the magnetic disk devices 112Y, 112M, 112C and 112K along the path shown in FIG. 4 (Step S402). It is outputted to the printer 40 and the processing terminates (END).

When a magnetic disk device is faulty (Y in Step S401), a message is shown on the operation display section 105 to notify that a magnetic disk device is faulty (Step S403). Then the printer 40 and other equipment are set so that the page spacing of the transfer paper for image formation is increased over the normal level (Step S404).

From the job management table 200, the storage control unit 121 acquires the storage form information 230 when the image data to be outputted this time is stored in the magnetic disk device (Step S405). It reads the image data of each color from the relevant magnetic disk device according to the storage form information 230 (Step S406). In this case, the image data stored in the magnetic disk device for that color is read along the path P4 shown in FIG. 4 and is stored in the image memory 114 of the image block of that color (Step S407).

The image data stored in a magnetic disk device not allocated for that color can be forwarded to the image memory 114 of the image block 110 of that color along the route backwardly tracing the paths P11 and P12 shown in FIG. 5 (Step S408). After that, the image data stored in the image memory 114 is outputted to the printer 40 along the paths P5, P6 and P7 shown in FIG. 4, wherein the data of four colors is outputted simultaneously in parallel (END).

The order of Step S407 and Step S408 can be reversed. When the failed color data has been stored separately into several correctly working magnetic disk devices, separate pieces of data can be reconfigured and integrated on either the RAM 104 or image memory 114.

Figure 10:
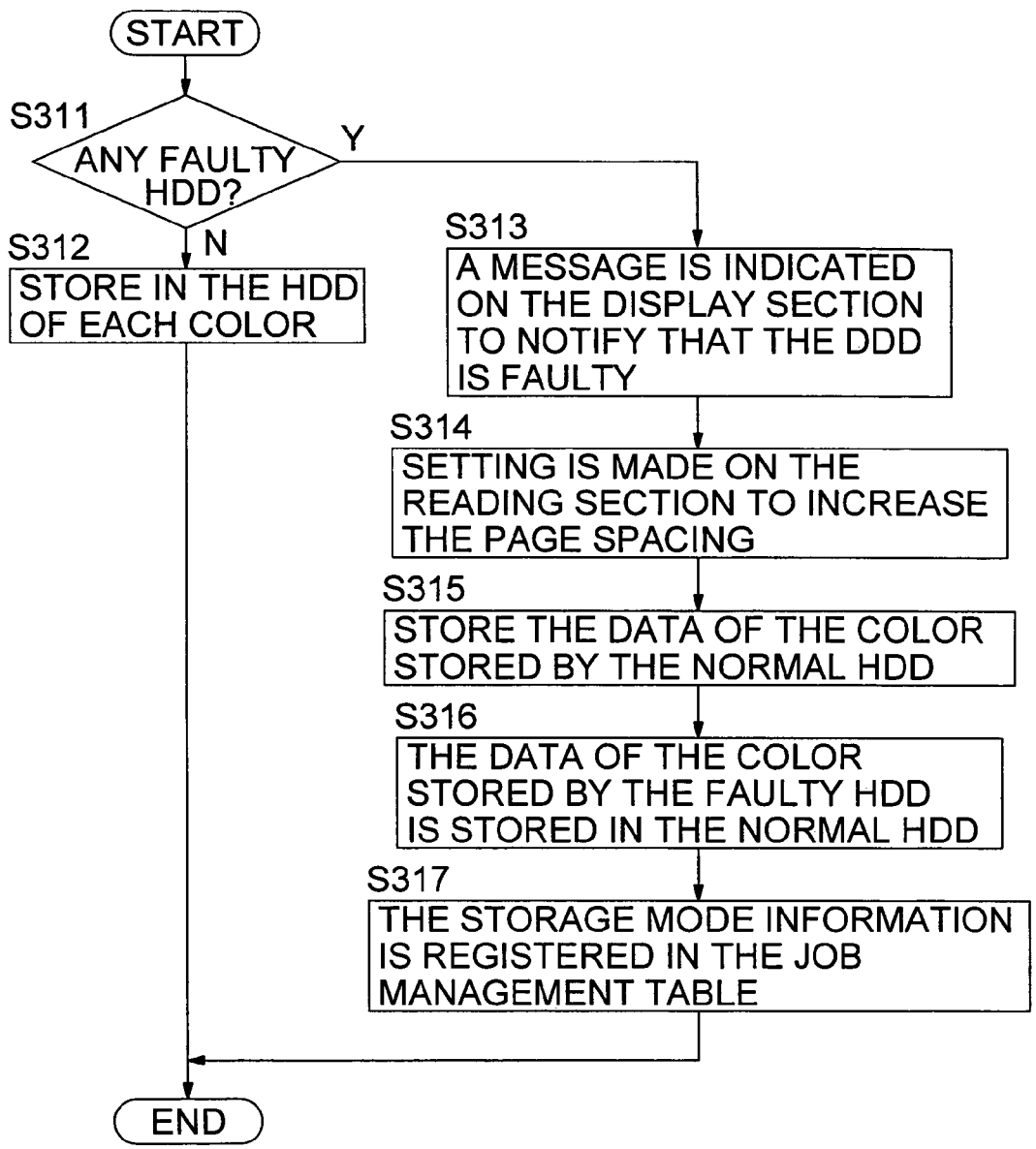
FIG. 10 is a flowchart representing the process of storing the image data when page spacing is increased during the reading of a document.

FIG. 10 shows the process of storing the image data when page spacing is increased during the reading of a document, instead of reducing the linear speed. In FIG. 10, setting is so made as to increase the page spacing in Step S314, instead of reducing the linear speed in Step S304 of FIG. 8. Other steps are the same as those of FIG. 8, and will not be described to avoid duplication.

As described above, when scanning is performed at an increased page spacing, the per-page scanning cycle is longer than usual. Despite the presence of a faulty magnetic disk device, this arrangement ensures sufficient time for storing the image data obtained by scanning the document, into the normally operative magnetic disk devices. Further, mere adjustment of the timing for feeding out the document is sufficient. This method provides simplified apparatus configuration and processing, as compared to the case of changing the linear speed.

The following describes various storage forms when the normally operative magnetic disk devices store the image data (failed color data) normally allocated for the faulty magnetic disk device.

First, the following describes the cases where failed color data is stored to the magnetic disk device having the least image data to process.

Figure 11:
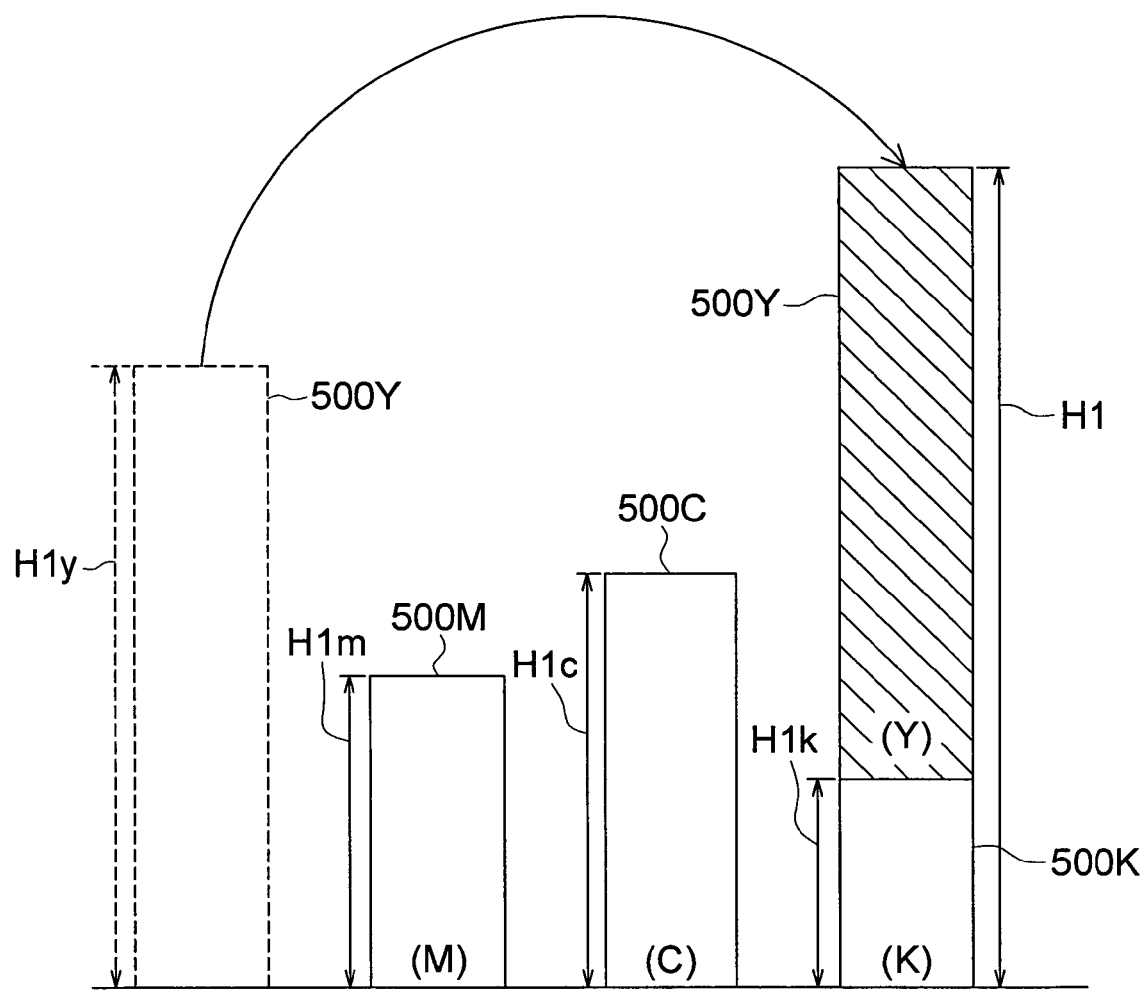
FIG. 11 is an explanatory diagram showing an example of the amount of data storage of each magnetic disk device when color data of a failed magnetic disk device is loaded to the magnetic disk device having the least amount of image data to process.

FIG. 11 shows an example of the amount of data storage of each magnetic disk device where failed color data is stored to the magnetic disk device having the least image data to process.

The bar chart in FIG. 11 shows the Y-color image data 500Y, M-color image data 500M, C-color image data 500C and K-color image data 500K. The H1$y$, H1$m$, H1$c$ and H1$k$ each indicate the amount of image data of each color or the time required for the storage into the magnetic disk device. The bar chart shown in a broken line shows that the magnetic disk device inherently storing the color is faulty. The failed color data stored into the normally operative magnetic disk devices is marked by an oblique line.

The amounts of the image data 500Y, 500M, 500C and 500K read by the reading section 30 depend on the difference in the number of pixels of each color in the color image and the compression rate. Under such conditions, when failed color data is to be stored in any one of the normally operative magnetic disk devices, it should be stored to the magnetic disk device having the least image data to process. This will minimize the time required to store the image data for the entire portion of this page.

FIG. 11 shows an example of such a case. It indicates that the Y-color image data 500Y is stored into the K-color magnetic disk device 112K, which has the least image data to process. The time H1 required to store the entire portion of this page is equivalent to the total of the time H1$k$ required to store the K-color image data 500K and the time H1$y$ required to store the failed color data 500Y.

The amount of the image data of each color is can be identified by checking the amount of compressed image data temporarily stored in the image memories 114Y, 114M, 114C and 114K.

Figure 12:
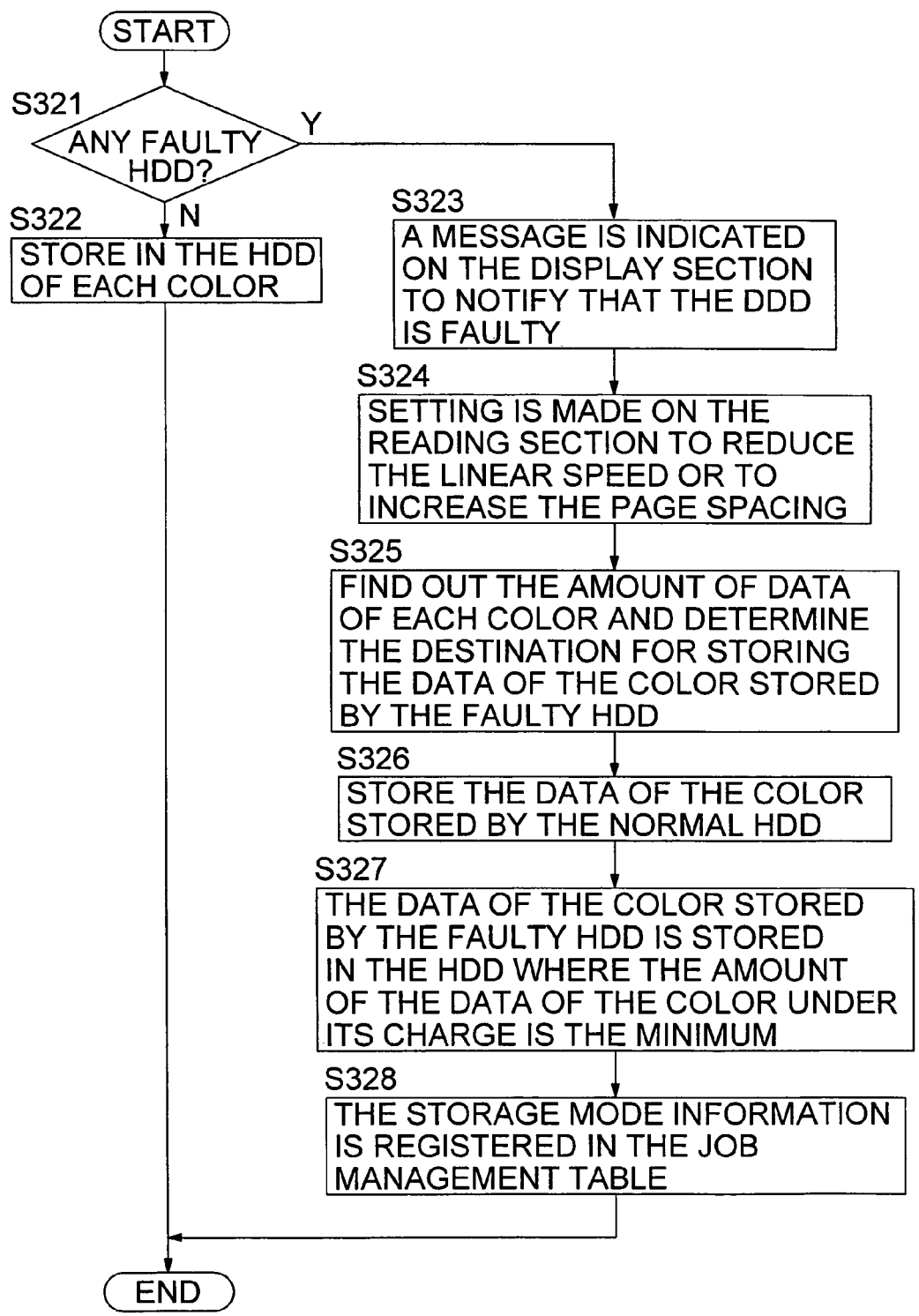
FIG. 12 is a flowchart showing the process of storing when color data of a failed magnetic disk device is loaded to the magnetic disk device having the least image data to process.

FIG. 12 shows the flow in the process of storing when failed color data is stored to the magnetic disk device having the least image data to process.

Before starting the document reading operation, the storage control unit 121 checks if magnetic disk devices 112Y, 112M, 112C and 112K are faulty or not (Step S321). If they are not faulty (N in Step S321), the image data of each color is stored in the magnetic disk devices 112Y, 112M, 112C and 112K respectively along the path shown in FIG. 3 (Step S322), and the processing terminates (END).

When the magnetic disk device is faulty (Y in Step S321), a message for the faulty is displayed on the operation display section 105 (Step S323), and the operation is made to select whether the linear speed in the reading section 30 should be reduced from the normal level or the page spacing at the time of document reading should be increased over the normal level. After the result of this section setting, the document is read (Step S324).

Then the system detects the amount of compressed image data temporarily stored in the image memories 114Y, 114M, 114C and 114K, and identifies the color with the minimum amount of data. Then the magnetic disk device for that color is determined as the device to be stored with the failed color data (Step S325).

The scanned image data of the color inherently allocated for the failed magnetic disk device is stored in the normally operative magnetic disk device along the path shown in FIG. 3 (Step S326). Then, the failed color data is stored in the magnetic disk device previously selected for storing, along the path shown in FIG. 5 (Step S327). Further, the storage form information 230 indicating correspondence between the image data of each color and the magnetic disk device stored with that image data is registered in the job management table 200 (Step S328) and the processing terminates (END).

Figure 13:
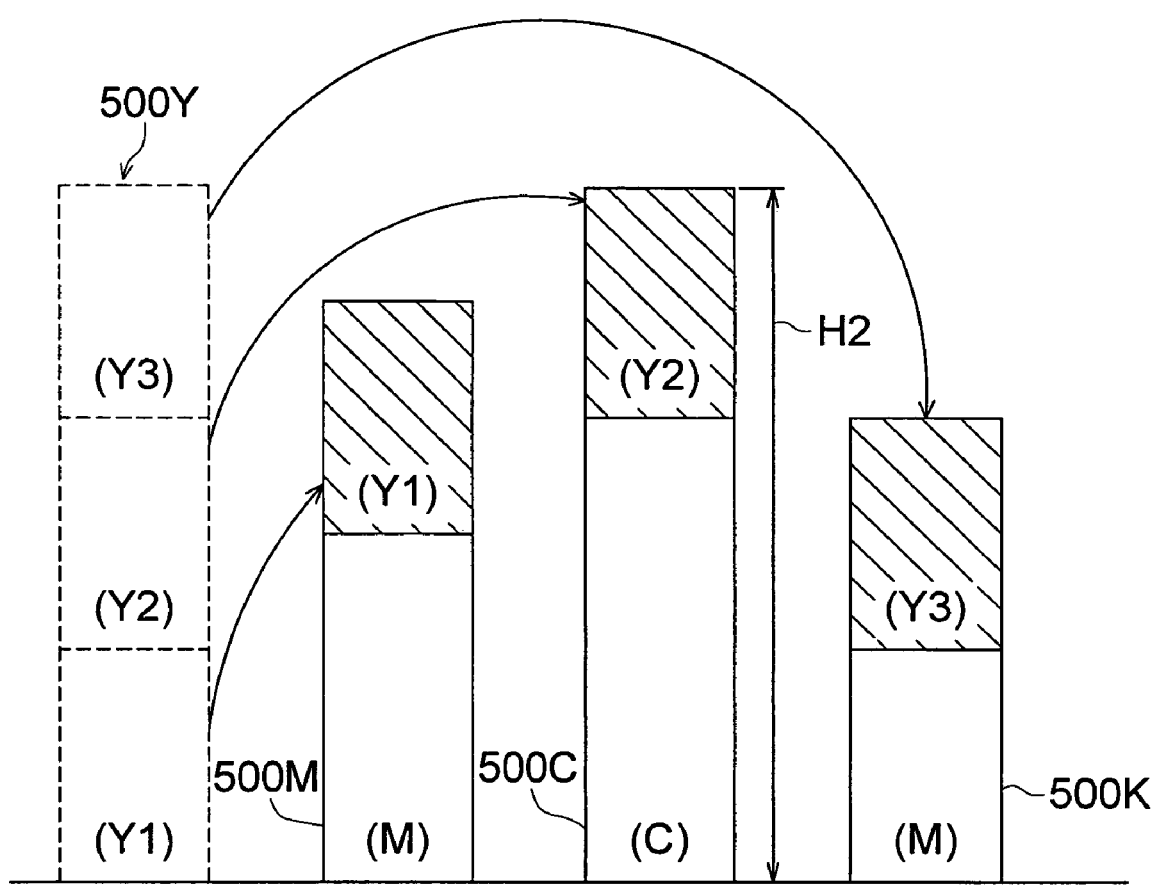
FIG. 13 is an explanatory diagram showing an example of the amount of data stored in each magnetic disk device when the color data for a failed magnetic disk device is evenly divided to be stored.

The following describes the cases wherein failed color data is uniformly divided and is stored into all of the normally operative magnetic disk devices:

FIG. 13 shows an example of the amount of data stored in each magnetic disk device when the failed color data is divided uniformly to be stored. In FIG. 13, the same image data as that of FIG. 11 is stored in a different storage form. Similarly to that in FIG. 11, the bar chart in FIG. 13 represents the amount of the image data of each color or the time required to store the data. The oblique line and dotted line in FIG. 13 also denote the same as those in FIG. 11.

The failed color data 500Y is divided uniformly into data Y1, data Y2 and data Y3 in accordance with the number of the normally operative magnetic disk devices (three in this case). Data Y1 is allocated for the magnetic disk device 112M, Data Y2 by the magnetic disk device 112C, and Data Y3 by the magnetic disk device 112K.

The total amount of image data to be stored into the magnetic disk device 112M is the amount of data Y1 plus the amount M-color image data 500M. The total amount of image data to be stored into the magnetic disk device 112C is the amount of data Y2 plus the amount of C-color image data 500C. The total amount stored into the magnetic disk device 112K is the amount of data Y3 plus the amount of K-color image data 500C. The time H2 required to store the entire portion of the page having been read is equal to the time required to store data into the magnetic disk device 112C wherein the greatest amount of data is stored. The time H2 required for storage is smaller than the time H1 required for storage shown in FIG. 11.

As described above, when storage of the failed color data is shared among the normally operative magnetic disk devices, the time required for storage of the entire page is often reduced as compared to the case where the failed color data is stored in one normally operative magnetic disk device. Further, when the data is simply divided uniformly, it is not necessary to check the amount of the data inherently allocated for the normally operative magnetic disk devices to find out which one has the least data to process. Thus, this arrangement provides the advantage of eliminating the need of such processing.

Figure 14:
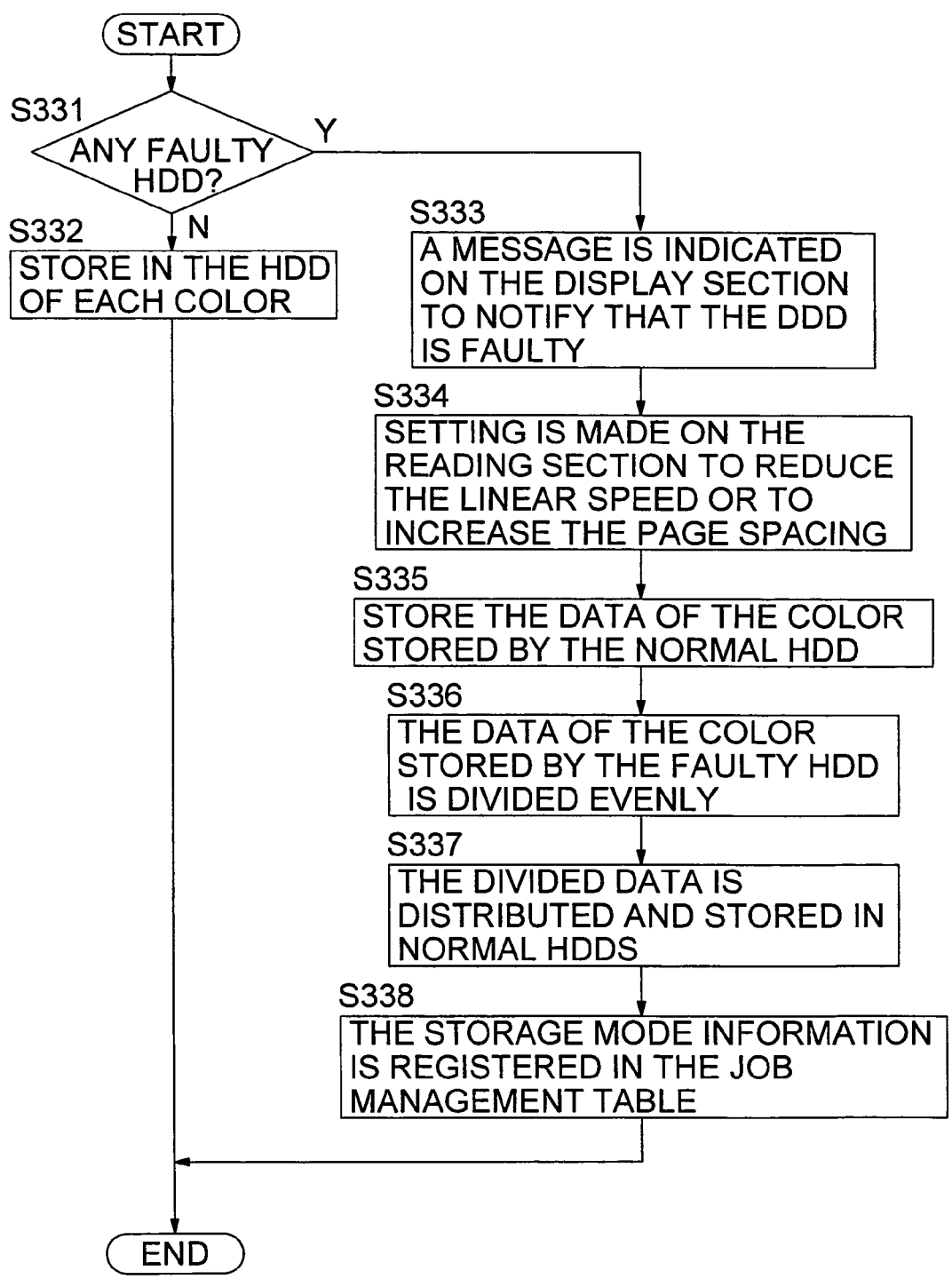
FIG. 14 is a flowchart showing the process of storing when the color data for a failed magnetic disk device is evenly divided to be loaded into normal magnetic disk devices.

FIG. 14 shows the process of storing when the failed color data is divided uniformly to be stored into the normally operative magnetic disk devices.

Before starting the document reading operation, the storage control unit 121 checks if magnetic disk devices 112Y, 112M, 112C and 112K are faulty or not (Step S331). If they are not faulty (N in Step S331), the image data of each color is stored in the magnetic disk devices 112Y, 112M, 112C and 112K respectively along the path shown in FIG. 3 (Step S322) simultaneously in parallel, and the processing terminates (END).

When a magnetic disk device is faulty (Y in Step S331), a message for the faulty is displayed on the operation display section 105 (Step S333), and the operation is made to select whether the linear speed in the reading section 30 should be reduced from the normal level or the page spacing at the time of document reading should be increased over the normal level. After the result of this section setting, the document is read (Step S334).

The image data of the color inherently allocated for the failed magnetic disk device is stored in the normally operative magnetic disk devices along the path shown in FIG. 3 (Step S335). The failed color data is divided uniformly in accordance with the number of the normally operative magnetic disk devices (Step S336). Uniformly divided pieces of image data are forwarded to normally operative magnetic disk devices along the path shown in FIG. 5, and are stored separately (Steps S337). Further, the storage form information 230 indicating correspondence between the image data of each color and the magnetic disk device stored with that image data is registered in the job management table 200 (Step S338) and the processing terminates (END).

Figure 15:
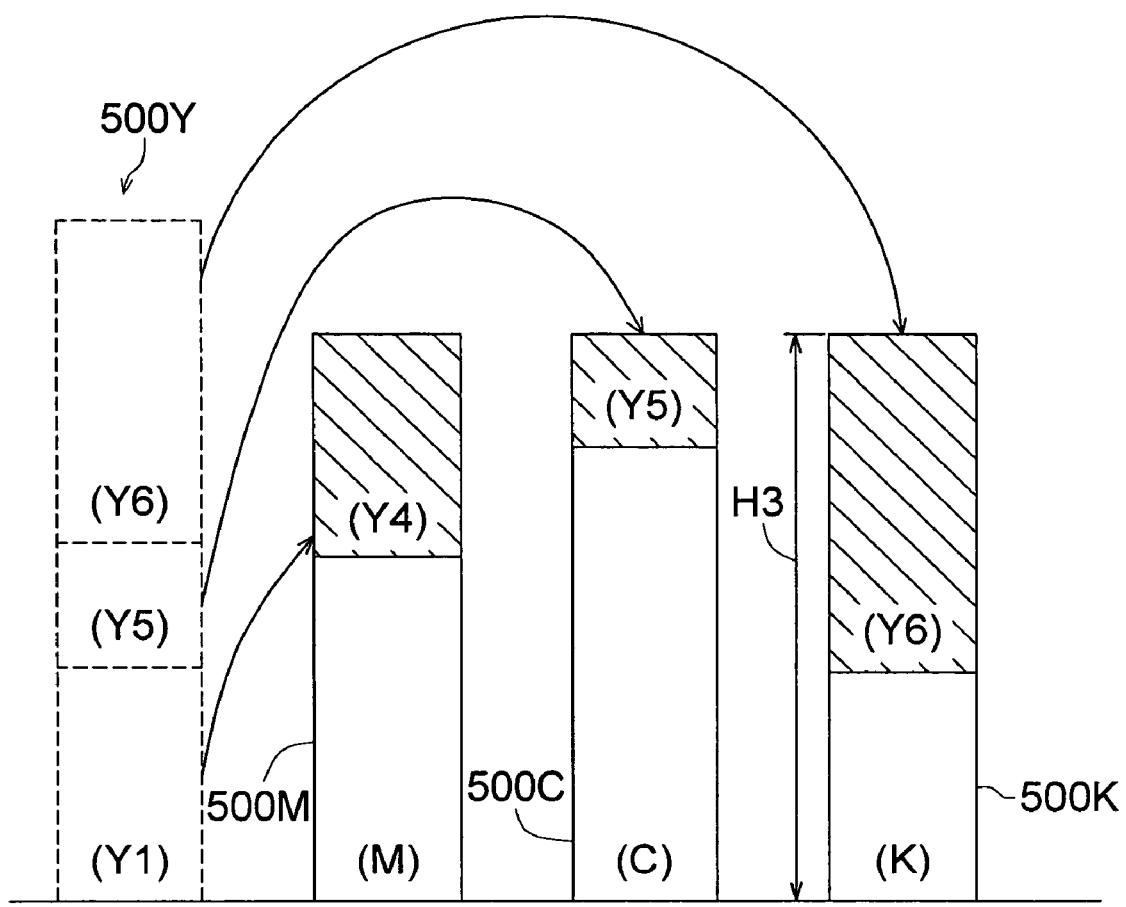
FIG. 15 is an explanatory diagram showing an example of the amount of data stored in each magnetic disk device when color data for a failed magnetic disk device is allocated so that all normally operative magnetic disk devices will store the overall amount of data uniformly.

The following describes the case where the failed color data is divided and allocated so that the overall amount of image data are uniform among the normally operative magnetic disk devices:

FIG. 15 shows an example of the amount of data stored in each magnetic disk device when failed color data is divided and allocated so that the overall amount of data are uniform in all normal magnetic disk devices. In FIG. 15, the same image data as that of FIG. 11 is stored in a different storage form. Similarly to that in FIG. 11, the bar chart in FIG. 15 represents the amount of the image data of each color or the time required to store the data. The oblique line and dotted line in FIG. 15 also denote the same as those in FIG. 11.

That the failed color data is divided and allocated so that the overall amount of data are uniform signifies that the failed color data is divided and allocated so that the amount of data inherently allocated for each of the normally operative magnetic disk devices is different, but the amount of data plus the newly stored amount of data are uniform. Specifically, the amount of data obtained by dividing the total amount of the data resulting from addition of the amounts of the image data of all colors (500Y+500M+500C+500K), by the number of the normally operative magnetic disk devices (three in this case) is the overall amount of image data to be stored into individual normally operative magnetic disk devices. Thus, individual normally operative magnetic disk devices take the responsibility of storing the failed color data in the amount equivalent to the difference between the overall amount of image data and the amount of image data of the color inherently stored.

FIG. 15 gives an example of such a storage form. The faulty color image data 500Y is divided into data Y4, Y5 and Y6 and allocated in such a way that M-color image data 500M+data Y4=C-color image data 500C+data Y5=K-color image data 500K+data Y6=the overall amount of image data.

Since allocation of failed color data so that the overall amount of image data are uniform, the times H3 required for storage into the normally operative magnetic disk devices 112Y, 112M, 112C and 112K will become the same. Thus, simultaneous and parallel storage-into these magnetic disk devices 112Y, 112M, 112C and 112K terminates almost at the same time. This procedure minimizes the time required for storage or scanning of the overall image data of this page in many cases.

Figure 16:
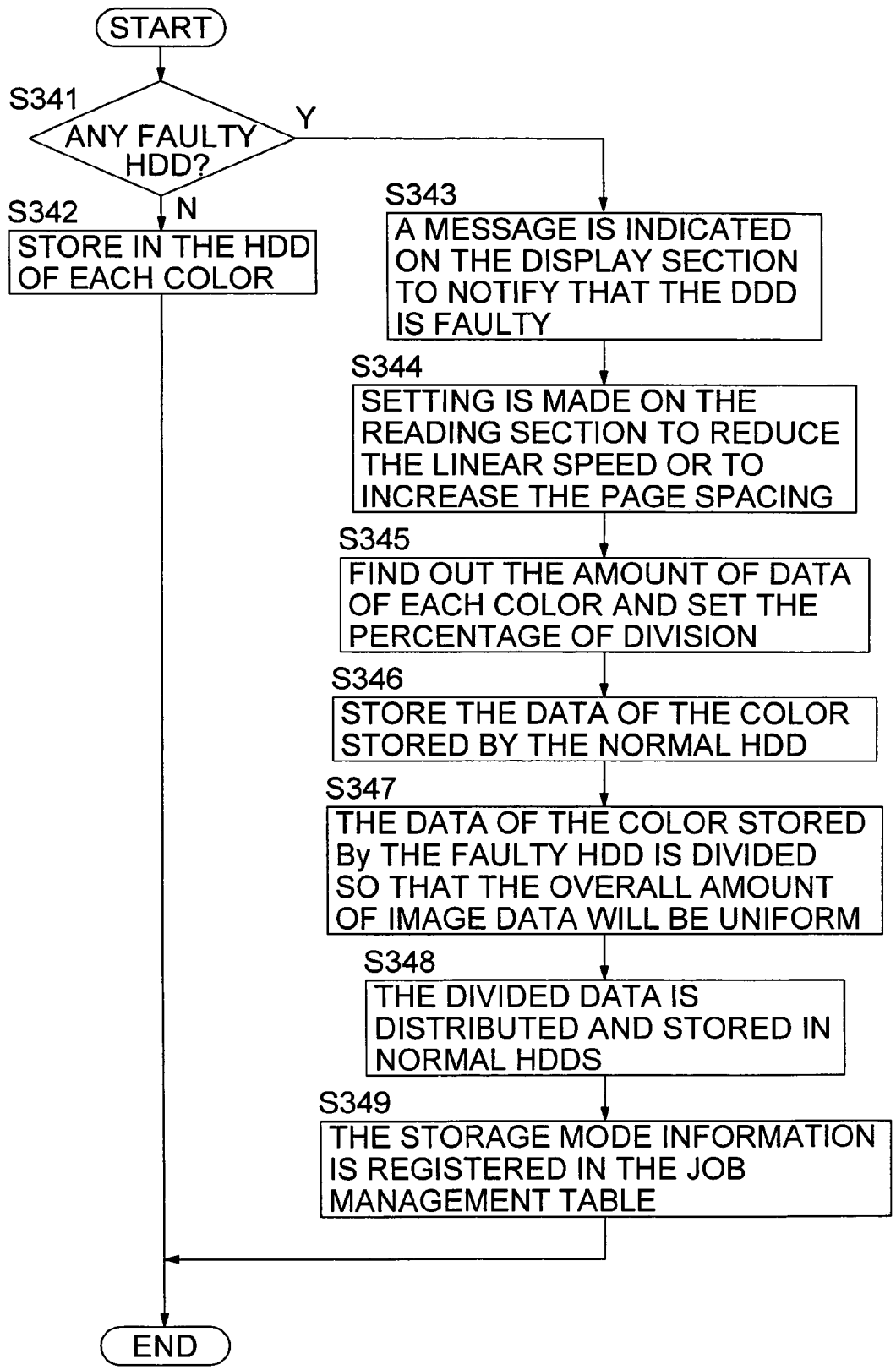
FIG. 16 is a flowchart showing the process of storing the image data when color data for a failed magnetic disk device is allocated so that all normally operative magnetic disk devices will store the overall amount of data uniformly.

FIG. 16 shows the process of storing the image data when failed color data is divided and allocated so that the overall amount of data to be stored are uniform in all normal magnetic disk devices.

The storage control unit 121 checks if the magnetic disk devices 112Y, 112M, 112C and 112K are faulty or not (Step S341). If they are not faulty (N in Step S341), the image data of each color is stored simultaneously and in parallel into the magnetic disk devices 112Y, 112M, 112C and 112K allocated for respective colors, along the path shown in FIG. 3 (Step S342), and the processing terminates (END).

If any of the magnetic disk devices is faulty (Y in Step S341), the operation display section 105 indicates a message to notify that the magnetic disk device is faulty (Step S343). The operation is made to select whether the linear speed in the reading section 30 should be reduced from the normal level or the page spacing at the time of document reading should be increased over the normal level. After the result of this section has been set, the document is read (Step S344).

Then the system detects the amount of the temporarily stored image data of each color, and determines the percentage of dividing the failed color data and the destination of storage (Step S345) so that the overall amount of the image data to be stored into the normally operative magnetic disk devices are uniform.

After that, the image data of the color under the charge is stored in the normally operative magnetic disk devices along the path shown in FIG. 3 (Step S346). Further, the failed color data is divided in accordance with the previously determined percentage of dividing the failed color data (Step S347), and is allocated and stored in each magnetic disk device along the path shown in FIG. 5. The storage form information 230 showing the percentage of dividing the failed color data and the correspondence between the divided pieces of failed color data and the magnetic disk device to be stored with the data is stored into the job management table 200 (Step S349) and the processing terminates (END).

Uniform division of the image data to be stored into the normally operative magnetic disk devices reduces the storage time more effectively than any other method for division and allocation. This arrangement keeps the decrease in the linear speed and increase in page spacing to a minimum.

According to the color image forming apparatus described above, even when part of the magnetic disk devices has stopped functioning, the image data of the color allocated for the faulty image storing device is stored into other normally operative image storing devices. This arrangement maintains the function as the device. Further, this arrangement eliminates the need of installing a standby image storing device, thereby cutting down the costs.

When part of the image storing devices is not functioning, the number of the scanning lines per unit time for the reading and image formation operation is reduced or page spacing is increased so as to increase the per-page processing time allowed in the image storing device. This arrangement ensures the time longer than usual that is required by other normally operative magnetic disk devices subjected to added loads, thereby permitting image reading operation and image formation operation to be continued.

The embodiment of the present invention has been described. It is to be expressly understood, however, that the present invention is not restricted thereto. The present invention can be embodied in a great number of variations with appropriate modification or additions, without departing from the technological spirit and scope of the invention claimed. For example, In the present embodiment, the decrease in the linear speed in the reading section 30 and the increase in the page spacing at the time of document reading are set in the processing of storage. Simultaneously with this setting, decrease in the linear speed at the time of image formation and increase in the page spacing can be set.

In the present embodiment, four magnetic disk devices are installed. Thus, the maximum number of the divisions of the image data of the color allocated for the faulty magnetic disk device is "3", and the storage form information 230 is composed of three blocks. The number of blocks can be set corresponding to the number of the magnetic disk devices containing in the color image forming apparatus 10.

The information stored as the storage form information 230 is not restricted to that shown in FIG. 7. For example, the size of the image data stored can be expressed in terms of percentage of its color in the overall image data, or in bytes. Alternatively, the size can be expressed in sectors. When the image data is managed in the file format, the file name can be registered. In this case, the file storage address and size should be managed by a separate file system. Further, in the present embodiment, only the storage form information 230 is indicated as the page data 220. For example, paper size, the direction of printing on paper (length by width), enlargement/reduction ratio and various forms of attribute information related to the page may be registered. Without being built in the image forming apparatus, the image storing devices such as magnetic disk devices may be installed as external devices, or may be arranged in a allocated form on the network, so that a system is formed as a whole.

In the present embodiment, a message is given on the operation display section 105 to notify that a failure has occurred in the magnetic disk device. For example, a message can be from the network control section 106 to the external terminal connected to the network to notify that a failure has occurred in the magnetic disk device and repair is requested. Alternatively, electronic mail may be used to send this message. This procedure will encourage quick replacement of the magnetic disk device and will reduce the downtime wherein the magnetic disk device is faulty.

For example, when a request for printing has been received from the external terminal, the aforementioned message is sent to that external terminal. This will allow the user at the external terminal to recognize that the printing speed is lower than usual.

In the present embodiment, the image data is inputted from the reading section 30. Image data from the external terminal or data using page descriptive language may be inputted through the network control section 106. In this case, the color-based image data may be obtained in the form of image information or the code data expressed in terms of page descriptive language. This information is then converted into a raster image by the printer controller, whereby color-based image data is obtained.

In this manner, it is possible to configure a system for controlling the external magnetic disk device, i.e., image storing device and the external reading section.

In the present embodiment, one of the magnetic disk devices is faulty. Even when two or more magnetic disk devices are faulty, they can be handled in the similar manner. In this case, the linear speed set by the scanning speed control section 122 and the page spacing set by the page spacing control section 123 should be adjusted corresponding to failure conditions such as the number of the faulty magnetic disk devices.

In the present embodiment, space spacing is increased during the image output operation at the time of failure. Per-page processing time can be ensured by reducing the linear speed in image formation. For example, the following control procedure will be effective: The speed at which the intermediate transfer belt 41 is driven in the arrow-marked direction of B is reduced to a half. Then the laser beam of the laser unit is applied to the photoconductor drum in such a way that laser beam is applied in on/off exposure for the image data in the step of first scanning, and is not applied in the step of second scanning. This procedure allows one scan time to be virtually doubled, without having to change the polygon mirror drive speed, thereby providing easy control.

In the present embodiment, when determining the destination for storing the failed color data or the percentage of division, the per-page image data is used as a reference. The present embodiment can be arranged in such a way that, when continuous copying operation is to be performed, the destination for storing the failed color data or the percentage of division is determined by giving overall consideration to the image data for multiple pages. This arrangement allows the amount of image data for multiple pages to be grasped as one block, and permits the destination for storing the failed color data or the percentage of division to be determined. The load in the processing of decision is reduced as compared to the case where a decision is made for each page. Further, this method of decision gives overall consideration to the image data for multiple pages. More adequate storage destination and percentage of decision will be determined than when a decision is made for each page.

In the present embodiment, when the failed color data is to be stored into multiple magnetic disk devices, it is allocated to all the normally operative magnetic disk devices. It can be allocated to some of multiple magnetic disk devices. For example, if there is a conspicuous difference in the amounts of the image data inherently allocated for the normally operative magnetic disk devices, it is possible to allocate the data only to the normally operative magnetic disk devices, except for those storing an extremely large amount of data. It is also possible to arrange such a configuration that the method of allocation and the destination of allocation are selected by the user.

The present embodiment has been described with reference to an example of using the method of decreasing the linear speed and increasing the page spacing in order to ensure the time for storing the failed color data. The method of decreasing the linear speed and increasing the page spacing can be used only when the available storage space in the image memory is insufficient. Specifically, when the image memory 114 as a buffer memory can be used to make up for the prolonged processing time for the other normally operative magnetic disk device to store the failed color data, control may be provided in such a way that the linear speed will not be reduced. In the present embodiment, either the method of decreasing the linear speed or the method of increasing the page spacing is used. These two methods can be used in combination. It is also possible to arrange such a configuration that the user can select the method(s).

While the normally operative magnetic disk devices is storing the image data of the color allocated inherently, the failed color data should be sent to the RAM 104. This procedure expedites the preparatory work for storing the failed color data into the magnetic disk device, and reduces the time for sending the failed color data to the destination for storage.

Further, the present embodiment can be arranged in such a way that the destination for storing the failed color data or the percentage of division are determined by giving consideration to the available storage space of the normally operative magnetic disk devices. For example, it is possible to make arrangements in such a way that only the magnetic disk device having the available storage space above the standard level can be selected as the destination for storage, or that the percentage of storage is determined in response to available storage space.

In the present embodiment, the magnetic disk device is used as the destination for storing the image data. For example, the photomagnetic disk apparatus, rewritable compact disk apparatus or DVD (Digital Versatile Disk) apparatus can be used. A semiconducting memory, for example, may be used. Of these storage apparatuses, a storage apparatus subjected to a mechanical failure will provide a preferable object in which the present invention is embodied.

What is claimed is:

1. A color image forming apparatus for reading a document by optical scanning and for forming a color image by an image forming section. said color image forming apparatus comprising:
   an image reading section for obtaining color-based image data for forming the color image;
   a plurality of image storing devices for storing the color-based image data obtained by said image reading section, divided for each color;
   a scanning speed control section for controlling a number of scanning lines per unit time for said image reading section; and
   a storage control section for controlling storage of the image data into said image storing devices, and for reading the image data stored in said image storing devices;
   wherein, if any one of said image storing devices fails, the storage control section stores image data of a color for the failed image storing device into an operating image storing device, and the scanning speed control section reduces a number of scanning lines per unit time from a normal level for said image reading section,
   wherein said storage control section controls the image data storage so that the image data of the color allocated for the failed image storing device is stored into the operating image storing device in a predetermined storage form, and said storage control section controls the image data reading so that said image data is read out based on the storage form,
   wherein said storage control section memorizes storage form information representing the storage form, and said image data is read out based on the memorized storage form information,
   wherein said storage form information includes information indicating the operating image storing device for storing the image data of the color allocated for the failed image storing device.

2. The color image forming apparatus of claim 1, wherein, when the number of scanning lines per unit time of said image reading section is reduced, said scanning speed control section increases a number of reading clocks per line corresponding to the reduced number of scanning lines per unit time.

3. The color image forming apparatus of claim 1, wherein, when the image data of the color allocated for said failed image storing device is divided and stored into a plurality of operating image storing devices, said storage form information includes:
   information indicating the operating image storing devices in which said image data is stored; and
   information indicating a storage position of the image data stored in each of the plurality of operating image storing devices, in the image data before being divided.

4. The color image forming apparatus of claim 1, wherein said storage form information includes:
   information indicating a storage position of said image data in the operating image storing device having stored the image data of the color allocated for said failed image storing device; and
   information indicating data size.

5. The color image forming apparatus of claim 1, wherein said storage control section controls the image data storage so that the image data of the color allocated for the failed image storing device is stored in the operating image storing device where an amount of the image data of the color inherently allocated is minimum.

6. The color image forming apparatus of claim 1, wherein said image storing device is a magnetic disk device.

7. The color image forming device apparatus of claim 1, wherein, if any one of said image storing devices fails, a notification message is displayed.

8. A color image forming apparatus for reading a document by optical scanning and for forming a color image by an image forming section. said color image forming apparatus comprising:
   an image reading section for obtaining color-based image data for forming the color image;
   a plurality of image storing devices for storing the color-based image data obtained by said image reading section, divided for each color;
   a scanning speed control section for controlling a number of scanning lines per unit time for said image reading section; and a storage control section for controlling storage of the image data into said image storing devices, and for reading the image data stored in said image storing devices;

wherein, if any one of said image storing devices fails, the storage control section stores image data of a color for the failed image storing device into a plurality of operating image storing devices, and the scanning speed control section reduces a number of scanning lines per unit time from a normal level for said image reading section, and wherein said storage control section controls the image data storage so that the image data of the color allocated for the failed image storing device is divided and stored in the operating image storing devices.

9. The color image forming apparatus of claim 8, wherein said storage control section controls the image data storage so that the image data of the color allocated for the failed image storing device is divided and stored in such a way that an overall amount of data stored in each of the plurality of operating image storing devices is uniform.

10. A color image forming apparatus for reading a document by optical scanning and for forming a color image by an image forming section, said color image forming apparatus comprising:

an image reading section for obtaining color-based image data for constituting the color image;

a plurality of image storing devices for storing the image data obtained by said image reading section, divided for each color;

a page spacing control section for controlling a page spacing for which the image reading section scans the document; and a storage control section for controlling storage of the image data into said image storing devices, and for reading the image data stored in said image storing devices;

wherein, if any one of said image storing devices fails, the storage control section stores image data of a color allocated for the failed image storing device into an operating image storing device, and the page spacing control section increases the page spacing in the image reading section over a normal page spacing, wherein said storage control section controls the image data storage so that the image data of the color allocated for the failed image storing device is stored into the operating image storing device in a predetermined storage form, and said storage control section controls the image data reading so that said image data is read out based on the storage form, wherein said storage control section controls the image data storage so as to memorize storage form information representing the storage form in which the image data of the color allocated for the failed image storing device is stored into the operating image storing device, and said storage control section controls the image data reading so that said image data is read out based on the memorized storage form information, and wherein said storage form information includes information indicating the operating image storing device for storing the image data of the color allocated for the failed image storing device.

11. The color image forming system of claim 10, wherein said page spacing control section increases the page spacing by inserting a wait time before starting a document reading operation.

12. The color image forming system of claim 10, wherein when the image data of the color allocated for said failed image storing device is divided and stored into a plurality of operating image storing devices, said storage form information includes:

information indicating the operating image storing devices in which said image data is stored; and information indicating a storage position of the image data stored in each of the operating image storing devices, in the image data before being divided.

13. The color image forming system of claim 10, wherein said storage form information includes:

information indicating a storage position of said image data in the operating image storing device having stored the image data of the color allocated for said failed image storing device; and information indicating data size.

14. The color image forming system of claim 10, wherein said storage control section controls the image data storage so that the image data of the color allocated for the failed image storing device is stored in the operating image storing device where an amount of the image data of the color inherently allocated is minimum.

15. The color image forming system of claim 10, wherein said page spacing control section increases the page spacing over the normal page spacing for which said image forming section forms images on sheets.

16. The color image forming device system of claim 10, wherein, if any one of said image storing devices falls, a notification message is displayed.

17. A color image forming apparatus for reading a document by optical scanning and for forming a color image by an image forming section, said color image forming apparatus comprising:

an image reading section for obtaining color-based image data for constituting the color image;

a plurality of image storing devices for storing the image data obtained by said image reading section, divided for each color;

a page spacing control section for controlling a page spacing for which the image reading section scans the document; and a storage control section for controlling storage of the image data into said image storing devices, and for reading the image data stored in said image storing devices;

wherein, if any one of said image storing devices fails, the storage control section stores the image data of the color allocated for the failed image storing device into a plurality of operating image storing devices, and the page spacing control section increases the page spacing in the image reading section over a normal page spacing, and wherein said storage control section controls the image data storage so that the image data of the color allocated for the failed image storing device is divided and stored in the operating image storing devices.

18. The color image forming apparatus of claim 8, wherein said storage control section controls the image data storage so that the image data of the color allocated for the failed image storing device is divided and stored in such a way that an overall amount of data stored in each of the plurality of operating image storing devices is uniform.

* * * * *

UNITED STATES PATENT AND TRADEMARK OFFICE
CERTIFICATE OF CORRECTION

PATENT NO. : 7,573,597 B2  Page 1 of 1
APPLICATION NO. : 11/220700
DATED : August 11, 2009
INVENTOR(S) : Hiroyuki Futami It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1007 days.

Signed and Sealed this

Seventh Day of September, 2010

David J. Kappos
*Director of the United States Patent and Trademark Office*